(12) United States Patent
Miyake

(10) Patent No.: US 8,795,927 B2
(45) Date of Patent: Aug. 5, 2014

(54) HIGHLY DURABLE ELECTRODE CATALYST LAYER

(75) Inventor: Naoto Miyake, Kamakura (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 1558 days.

(21) Appl. No.: 11/793,995

(22) PCT Filed: Mar. 29, 2005

(86) PCT No.: PCT/JP2005/005840
§ 371 (c)(1),
(2), (4) Date: Jun. 25, 2007

(87) PCT Pub. No.: WO2006/067872
PCT Pub. Date: Jun. 29, 2006

(65) Prior Publication Data
US 2008/0096078 A1    Apr. 24, 2008

(30) Foreign Application Priority Data

Dec. 24, 2004 (JP) ................................ 2004-372629

(51) Int. Cl.
*H01M 4/02* (2006.01)
*H01M 4/36* (2006.01)

(52) U.S. Cl.
USPC ........................... 429/529; 429/523; 429/530

(58) Field of Classification Search
CPC .................................................. H01M 8/1048
USPC ....................................................... 429/529
See application file for complete search history.

(56) References Cited

U.S. PATENT DOCUMENTS

| | | | |
|---|---|---|---|
| 6,492,295 B2 * | 12/2002 | Hitomi et al. ................. | 502/159 |
| 2003/0198860 A1 * | 10/2003 | Yasumoto et al. .............. | 429/43 |
| 2004/0028976 A1 * | 2/2004 | Cabasso et al. ................. | 429/33 |
| 2004/0081877 A1 * | 4/2004 | Kim et al. ........................ | 429/33 |
| 2004/0106044 A1 * | 6/2004 | Kerres ........................... | 429/314 |
| 2006/0008690 A1 | 1/2006 | Uensal et al. | |
| 2006/0045985 A1 * | 3/2006 | Kozak ........................... | 427/458 |

FOREIGN PATENT DOCUMENTS

| | | |
|---|---|---|
| DE | 102 46 459 | 4/2004 |
| JP | 7-326361 | 12/1995 |
| JP | 2001-11219 | 1/2001 |
| JP | 2001-246041 | 9/2001 |
| JP | 2001-325963 | 11/2001 |
| JP | 2004-131532 | 4/2004 |
| JP | 2004-134269 | 4/2004 |
| JP | 2004-512652 | 4/2004 |
| JP | 2004-146367 | 5/2004 |
| JP | 6-111827 | 4/2007 |

OTHER PUBLICATIONS

A. B. LaConti, M. Hamdan and R.C. McDonald, Handbook of Fuel Cells, H. A. Gasteiger, A. Lamm. Editors, vol. 3, p. 648, John Wiley & Sons, New York (2003).
M. S. Wilson and Gottesfeld, "Thin-film catalyst layers for polymer electrolyte fuel cell electrodes" Journal of Applied electro-chemistry, 22 p. 1-7 (1992).
International Search Report of the International Published Application No. PCT/JP2005/005840 (mailed Jul. 12, 2005).
Office Action issued in corresponding German Patent Application No. 11 2005 003 202.7, mailed on Feb. 22, 2008.
Kohei Goto et al., "Development of Aromatic Polymer Electrolyte Membrane with High Conductivity and Durability for Fuel Cell", JSR Technical Revice No. 116/2009, pp. 1-12.

* cited by examiner

*Primary Examiner* — Barbara Gilliam
*Assistant Examiner* — Steven Scully
(74) *Attorney, Agent, or Firm* — Staas & Halsey LLP

(57) ABSTRACT

An electrode catalyst layer characterized by comprising composite particles comprising electrode catalyst particles supported on electrically conductive particles, a perfluorocarbonsulfonic acid resin (component A) and a polyazole compound (component B), the content of the composite particles being 20 to 95% by weight, the total weight of component A and component B being 5 to 80% by weight, the weight ratio between component A and component B (A/B) being 1 to 999.

14 Claims, No Drawings

HIGHLY DURABLE ELECTRODE CATALYST LAYER

CROSS REFERENCE TO RELATED APPLICATIONS

This application is based on and claims priority to PCT Application No. PCT/JP2005/005840 filed Mar. 29, 2005 and Japanese Application No(s). 2004-372629 filed Dec. 24, 2004 in Japan, the disclosures of which are hereby incorporated herein by reference.

TECHNICAL FIELD

The present invention relates to an electrode catalyst layer for a solid polymer fuel cell.

BACKGROUND ART

Fuel cells generate electric energy by an electrochemical within the cell reaction between a fuel (hydrogen source) and an oxidant (oxygen). Specifically, the chemical energy of the fuel is directly converted into electric energy. Examples of fuel sources which can be used include pure hydrogen and compounds containing hydrogen element, such as petroleum, natural gases (such as methane) and methanol.

Fuel cells have the following advantageous characteristics. A fuel cell itself employs no mechanical parts and, therefore, it generates little noise. Further, in principle, a fuel cell can semipermanently continue to generate electricity if fuel and oxidant are continuously supplied from outside of the cell.

Electrolytes can be classified into liquid electrolytes and solid electrolytes. A fuel cell which employs a polymer electrolyte membrane as an electrolyte is called a "solid polymer fuel cell".

Solid polymer fuel cells are especially able to operate at low temperatures, as compared with other fuel cells. Accordingly, solid polymer fuel cells are expected as an alternative power source for automobiles and the like, as well as household cogeneration systems and portable electric power generators.

A solid polymer fuel cell at least comprises a membrane electrode assembly (hereinafter sometimes abbreviated to "MEA") comprised of an electrode catalyst layer which is joined to both sides of a polymer electrolyte membrane. The term "polymer electrolyte membrane" mentioned here is a material which has strongly acidic groups, such as a sulfonic acid group or a carboxylic acid group, in a polymer chain thereof and allows selective permeation of protons. Examples of such a polymer electrolyte membrane which can be preferably used include perfluorinated proton exchange membranes, such as Nafion™ (manufactured by E.I. duPont de Nemours & Company Inc., U.S.A) having high chemical stability.

Examples of an electrode catalyst layer which can be preferably used include a thin sheet composed of a composite particle having an electrode catalyst particle supported on a carbon particle as illustrated in Non-Patent Document 1 and a catalyst composition consisting of a perfluorocarbon sulfonic acid resin as a proton conductive polymer (hereinafter referred to as "conventional electrode catalyst layer"). Further, if necessary, structures are also used in which the MEA is sandwiched between a pair of gas diffusion layers. In such a case, the laminated body consisting of the electrode catalyst layers and gas diffusion layers is referred to as a "gas diffusion electrode".

For the operation of a fuel cell, a fuel (e.g., hydrogen) and an oxidant (e.g., oxygen or air) are, respectively, supplied to the anode side and cathode side gas diffusion electrodes, and the two electrodes are connected to each other through an external circuit. Specifically, when hydrogen is used as a fuel, hydrogen is oxidized on the anode catalyst to thereby generate protons, and the generated protons pass through a proton conductive polymer in the anode catalyst layer. Then, the protons travel in the polymer electrolyte membrane, pass through a proton conductive polymer in the cathode catalyst layer, and finally reach on the cathode catalyst. On the other hand, electrons which were generated simultaneously with the generation of protons from the oxidation of hydrogen flow through an external circuit and arrive at the cathode side gas diffusion electrode. On the cathode catalyst, the electrons react with the above protons and the oxygen in the oxidant to generate water, whereby electric energy can be obtained at this stage.

Such a solid polymer fuel cell is usually operated at around 80° C. in order to obtain high output characteristics. However, when used in an automobile, considering operation of the automobile in summer, it is desired that the fuel cell is able to operate under high temperature and low humidity conditions (operating temperature around 100° C. and a humidification of 60° C. (comparable to a relative humidity (RH) of 20%)). However, when a fuel cell employing a conventional perfluorocarbon sulfonic acid resin membrane as the polymer electrolyte membrane and a membrane electrode assembly consisting of a conventional electrode catalyst layer is operated for a long time under high temperature and low humidity conditions, the problems arise that cross leakage occurs as a result of the formation of pinholes in the polymer electrolyte membrane, and fluorine ions elute out. Consequently, sufficient durability cannot be achieved. This is thought to be due to chemical degradation caused by the perfluorocarbon sulfonic acid resin being attacked by hydroxyl radicals produced as a byproduct at either the anode catalyst or cathode catalyst (refer to A. B. LaConti, M. Hamdan and R. C McDonald, in "Handbook of Fuel Cells", H. A. Gasteiger, A. Lamm, Editors, Vol. 3, p. 648, John Wiley & Sons, New York (2003)).

Proposed methods for improving the electrode catalyst layer include a method of incorporating fine particulate and/or fibrous silica in an anode electrode catalyst layer (see, e.g., Patent Document 1), a method of incorporating a fine particle of a crosslinked polyacrylate as a water-absorbent material in an electrode catalyst layer (see, e.g., Patent Document 2), and a method of comprising a metalloxane polymer in the electrode catalyst layer (e.g. refer to Patent Documents 3 and 4). However, even with these methods it has not been possible to suppress the elution of fluorine ions and durability has been insufficient.

Also proposed has been an electrode catalyst layer containing a polyfunctional basic compound (see, e.g., Patent Document 5). Although such compounds exhibit a slight improvement in durability, they still cannot be said to be sufficient. Furthermore, polyfunctional basic compounds such as hexamethylene diamine poison the electrode catalyst made of platinum or the like, whereby it has not been possible to obtain good power generation characteristics.

In addition, a cathode catalyst layer containing an anionic conductive polymer and a cationic conductive polymer has also been proposed (see, e.g., Patent Document 6). In a proposed production method for this, a cationic conductive polymer and anionic conductive polymer in solution are both mixed with a support catalyst, and the resultant mixture is sprayed onto a membrane and hot pressed (see paragraph 0025 of Patent Document 6). If the anionic conductive polymer is polybenzimidazole, to prepare this polymer in solution it is necessary to dissolve it in a high boiling point aprotic solvent such as dimethylacetamide. However, such a high boiling point aprotic solvent will remain in the electrode catalyst layer and poison the electrode catalyst made of platinum or the like, and thus it has not been possible to obtain good power generation characteristics.

Non Patent Document: M. S. Wilson and Gottesfeld, Journal of Applied Electrochemistry, 22, p. 1 to 7 (1992)

Patent Document 1: JP-A-6-111827
Patent Document 2: JP-A-7-326361
Patent Document 3: JP-A-2001-11219
Patent Document 4: JP-A-2001-325963
Patent Document 5: JP-A-2002-246041
Patent Document 6: JP-A-2004-512652

DISCLOSURE OF THE INVENTION

Problem to be Solved by the Invention

The present inventors carried out intensive investigations to resolve the above-described problems in the prior art. Firstly, the present inventors found that a polyazole such as polybenzimidazole will dissolve in a protic solvent in the presence of an alkali metal hydroxide. The present inventors then found that this solution and a polymer solution consisting of a perfluorocarbon sulfonic acid resin mix well. In addition, the present inventors found that when producing an electrode catalyst layer with an electrolytic polymer solution comprising a perfluorocarbon sulfonic acid resin, a polyazole, and an alkali metal hydroxide which are dissolved or dispersed in a protic solvent, and a composite particle having an electrode catalyst particle supported on an electrically conductive particle, poisoning of the electrode catalyst by residual solvent can be avoided and good power generation characteristics can be obtained.

Also, the present inventors found that the electrode catalyst layer according to the present invention itself has excellent chemical stability; and further that when employing it in a membrane electrode assembly, a fuel cell can be provided in which the polymer electrolyte membrane exhibits high durability without cross leakage even for battery operation under high temperature and low humidity conditions, and in which the discharge of fluorine ions is low. The present inventors assume that this is because hydroxyl radicals produced as a byproduct in the fuel cell are captured by the polyazole-based compound constituting the electrode catalyst layer of the present invention, whereby it becomes more difficult for the proton-conducting polymer in the polymer electrolyte membrane and the electrode catalyst layer to be attacked by hydroxyl radicals.

The present inventors also found that the same effects as those described above can be obtained by preparing a powder of polyazole-based compound having an average particle size of 0.1 to 50 µm, or a composite powder (average particle size of 0.1 to 50 µm) consisting of a perfluorocarbon sulfonic acid resin and a polyazole-based compound, and then producing an electrode catalyst layer by using a perfluorocarbon sulfonic acid resin solution consisting only of the above-prepared powder and a protic solvent.

Based on the above findings, the present inventors found that both characteristics of good power generation and high durability could be simultaneously obtained, thereby achieving at the present invention.

Accordingly, it is one object of the present invention to provide a highly durable electrode catalyst layer having extremely high practical utility, which has excellent chemical stability, mechanical strength and heat resistance, and which also has high durability even when used under high temperatures.

It is another object of the present invention to provide a method for producing the above-described highly durable electrode catalyst layer.

It is still another object of the present invention to provide an electrolytic polymer solution which is necessary for the production of the above-described highly durable electrode catalyst layer.

It is still another object of the present invention to provide a solid polymer fuel cell wherein the highly durable electrode catalyst layer is closely held on either side of a polymer electrolyte membrane, and a solid polymer fuel cell in which this membrane electrode assembly is used.

The above-described invention as well as various other objects, characteristics and advantages thereof will become clear from the following detailed description and claims which shall be described with reference to the attached drawings.

According to one aspect of the present invention, provided is a highly durable electrode catalyst layer characterized by comprising a composite particle having an electrode catalyst particle supported on an electrically conductive particle, a perfluorocarbon sulfonic acid resin (component A) and a polyazole compound (component B), wherein the content of the composite particle is 20 to 95% by weight, the total weight of component A and component B is 5 to 80% by weight, and the weight ratio (A/B) between component A and component B is 1 to 999.

According to another aspect of the present invention, provided is a method for producing a highly durable electrode catalyst layer characterized by preparing an electrolytic polymer solution comprising a perfluorocarbon sulfonic acid resin (component A) having an ion exchange capacity of 0.5 to 3.0 milliequivalents/g, a polyazole (component B'), and an alkali metal hydroxide (component C) which are dissolved or dispersed in one or more protic solvents, wherein the total weight % of component A and component B' is 0.5 to 30% by weight, the weight % of component C is 0.001 to 5% by weight, and the weight ratio (A/B') between component A and component B' is 1 to 999; preparing an electrode catalyst composition in which a composite particle having an electrode catalyst particle supported on an electrically conductive particle is dispersed in the electrolytic polymer solution in a ratio of 1 to 100% by weight; and drying and solidifying the composition.

According to still another aspect of the present invention, provided is an electrolytic polymer solution comprising a perfluorocarbon sulfonic acid resin (component A) having an ion exchange capacity of 0.5 to 3.0 milliequivalents/g, a polyazole (component B'), and an alkali metal hydroxide (component C) which are dissolved or dispersed in one or more protic solvents, wherein the total weight of component A and component B' is 0.5 to 30% by weight, the weight % of component C is 0.001 to 5% by weight and the weight ratio (A/B') between component A and component B' is 1 to 999.

According to still another aspect of the present invention, provided is a membrane electrode assembly characterized in that a polymer electrolyte membrane, which consists of 50.00 to 99.99% by weight of a perfluorocarbon sulfonic acid resin (component A) having an ion exchange capacity of 0.5 to 3.0 milliequivalents/g and 0.01 to 50.00% by weight of a polyazole compound (component B), is in close contact with between an anode and a cathode and is supported, therebetween, wherein the anode comprises an anode catalyst layer and is proton conductive, the cathode comprises a cathode catalyst layer and is proton conductive, and the anode catalyst layer and/or cathode catalyst layer are the highly durable electrode catalyst layer according to the present invention.

According to still another aspect of the present invention, provided is a solid polymer fuel cell including the above-described membrane electrode assembly, characterized in that the anode and the cathode are joined to each other via an electron conductive material located on the outside of the polymer electrolyte membrane.

Next, to enable the present invention to be easily understood, the basic characteristics and preferable aspects of the present invention will be described below.

1. An electrode catalyst layer comprising a composite particle having an electrode catalyst particle supported on an electrically conductive particle, a perfluorocarbon sulfonic acid resin (component A) and a polyazole-based compound (component B), wherein the content of the content of the composite particle is 20 to 95% by weight, the total weight of component A and component B is 5 to 80% by weight, and the weight ratio (A/B) between component A and component B is 1 to 999.
2. The electrode catalyst layer according to item 1, wherein the polyazole-based compound is a polyazole salt.
3. The electrode catalyst layer according to item 1 or 2, wherein the polyazole-based compound is a polyazole alkali metal salt.
4. The electrode catalyst layer according to any one of items 1 to 3, wherein the polyazole-based compound is poly[(2,2'-(m-phenylene)-5,5'-bibenzimidazole)] metal salt.
5. The electrode catalyst layer according to any one of items 1 to 4, wherein the polyazole-based compound is a powder having an average particle size of 0.1 to 50 μm.
6. The electrode catalyst layer according to any one of items 1 to 4, which comprises a composite powder consisting of the perfluorocarbon sulfonic acid resin and the polyazole-based compound, wherein the composite powder has an average particle size of 0.1 to 50 μm.
7. A method for producing an electrode catalyst layer comprising the steps of: preparing an electrolytic polymer solution comprising a perfluorocarbon sulfonic acid resin (component A) having an ion exchange capacity of 0.5 to 3.0 milliequivalents/g, a polyazole (component B'), and an alkali metal hydroxide (component C) which are dissolved or dispersed in one or more protic solvents, the total weight of component A and component B' being 0.5 to 30% by weight, the weight % of component C being 0.001 to 5% by weight, and the weight ratio (A/B') between component A and component B' being 1 to 999; preparing an electrode catalyst composition in which a composite particle having an electrode catalyst particle supported on an electrically conductive particle is dispersed in the electrolytic polymer solution in a ratio of 1 to 100% by weight; and drying and solidifying the composition.
8. An electrode catalyst layer obtained by the production method of item 7.
9. An electrolytic polymer solution comprising a perfluorocarbon sulfonic acid resin (component A) having an ion exchange capacity of 0.5 to 3.0 milliequivalents/g, a polyazole (component B'), and an alkali metal hydroxide (component C) which are dissolved or dispersed in one or more protic solvents, wherein the total weight of component A and component B' is 0.5 to 30% by weight, the weight % of component C is 0.001 to 5% by weight and the weight ratio (A/B') between component A and component B' is 1 to 999.
10. A membrane electrode assembly comprising a polymer electrolyte layer consisting of 50.00 to 99.99% by weight of a perfluorocarbon sulfonic acid resin (component A) having an ion exchange capacity of 0.5 to 3.0 milliequivalents/g and 0.01 to 50.00% by weight of a polyazole-based compound (component B) which is in close contact with between an anode and a cathode and is supported therebetween, wherein the anode comprises an anode catalyst layer and is proton conductive, the cathode comprises a cathode catalyst layer and is proton conductive, and the anode catalyst layer and/or the cathode catalyst layer are the electrode catalyst layer according to any of items 1 to 8.
11. A solid polymer fuel cell including the membrane electrode assembly according to item 10, wherein the anode and the cathode are joined to each other via an electron conductive material located on the outside of the polymer electrolyte membrane.

The highly durable electrode catalyst layer and highly durable membrane electrode assembly according to the present invention can provide a highly durable fuel cell which has excellent chemical stability, and which has low discharge of fluorine ions even when operated for a long time under high temperature and low humidity conditions (e.g., battery operation temperature of 100° C. and 60° C. saturated water vapor pressure (comparable to a humidity (RH) of 20%)).

BEST MODE FOR CARRYING OUT THE INVENTION

The present invention will be described in more detail below.

(Highly Durable Electrode Catalyst Layer According to the Present Invention)

The highly durable electrode catalyst layer according to the present invention is characterized by comprising a composite particle having an electrode catalyst particle supported on an electrically conductive particle, a perfluorocarbon sulfonic acid resin and a polyazole-based compound.

Representative examples of the perfluorocarbon sulfonic acid resin include the polymers represented by chemical formula (1),

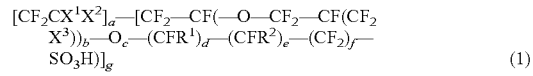

wherein $X^1$, $X^2$ and $X^3$ each independently represents a halogen or a perfluoroalkyl group having 1 to 3 carbon atoms, $0 \leq a < 1$, $0 < g \leq 1$, $a+g = 1$, $0 \leq b \leq 8$, "c" denotes 0 or 1, "d", "e" and "f" each independently denotes a number in the range of 0 to 6 (however, d+e+f does not equal 0), and $R^1$ and $R^2$ each independently represents a halogen or a perfluoroalkyl group or a fluorochloroalkyl group having 1 to 10 carbon atoms.

Among these examples, the perfluorocarbon polymers represented by the following formula (2) or (3) are preferable:

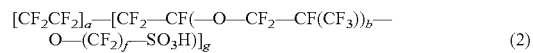

wherein $0 \leq a < 1$, $0 < g \leq 1$, $a+g=1$, and $1 \leq b \leq 3$, $1 \leq f \leq 8$;

wherein $0 \leq a \leq 1$, $0 < g \leq 1$, $a+g=1$, $1 \leq f \leq 8$.

The above-described perfluorocarbon sulfonic acid resin may also be a copolymer which further includes a unit derived from a perfluoroolefin such as hexafluoropropylene, chlorotrifluoroethylene, or a comonomer such as perfluoroalkyl vinyl ether.

Further, a part of the sulfonic acid may be substituted with a metal ion, such as alkali metal ions, alkali earth metal ions, transition metal ions, or an amine ($NH_4^+$, $N^+H_3R$, $N^+H_2R_2$, $N^+HR_3$, $N^+R_4$ (wherein R is an alkyl group or an aryl group)).

The ion exchange capacity of this perfluorosulfonic acid resin is preferably 0.5 to 3.0 milliequivalents/g, more preferably, 0.9 to 2.0 milliequivalents/g, and most preferably, 1.0 to 1.5 milliequivalents/g. The term "ion exchange capacity" as used here refers to the equivalent number of ion exchange groups contained per 1 g of dry-weight perfluorosulfonic acid resin.

The polyazole-based compound (component B) constituting the highly durable electrode catalyst layer according to the present invention is a heterocyclic compound, or polymer thereof, containing one or more nitrogen atoms in its ring, such as polyimidazole-based compounds, polybenzimidazole-based compounds, polybenzobisimidazole-based compounds, polybenzooxazole-based compounds, polyoxazole-based compounds, polythiazole-based compounds and polybenzothiazole-based compounds. Instead of nitrogen, the polyazole-based compound may contain oxygen or sulfur. The molecular weight of such polyazole-based compound may be from 300 to 500,000 in terms of average molecular weight.

In order to improve heat resistance, more preferably the polyazole-based compound is a polymer comprising, as a repeating unit, a compound obtained by bonding the five-membered heterocyclic compound containing one or more nitrogen atoms in its ring with a divalent aromatic group such as p-phenylene group, m-phenylene group, naphthalene group, diphenylene ether group, diphenylenesulfone group, biphenylene group, terphenyl group or 2,2-bis(4-carboxyphenylene)hexafluoropropane group. Specifically, a polyazole-based compound comprising poly[2,2'-(m-phenylene)-5,5'-bibenzimidazole] is preferable.

The polyazole-based compound may have an ion exchange group introduced by the following general modification method. A modified polyazole-based compound having an ion exchange group introduced therein refers to a compound into which at least one of an amino group, quaternary ammonium group, carboxyl group, sulfonic acid group and phosphonic acid group has been introduced. The amount of the ion exchange group introduced into the polyazole-based compound is preferably from 0.1 to 3.5 milliequivalents/g in terms of ion exchange capacity.

The above polyazole-based compound and modified polyazole-based compound can be used alone, or as a mixture of two or more. The method for modification of the polyazole-based compound is not especially limited. For example, an ion exchange group may be introduced into a polyazole-based compound using fuming sulfuric acid, concentrated sulfuric acid, sulfuric anhydride or a complex thereof, sultones such as propanesultone, α-bromotoluenesulfonic acid or chloroalkylphosphonic acid. An ion exchange group may be introduced into a polyazole-based monomer, which may be then polymerized.

Examples of the polybenzimidazole-based compound include the compounds represented by chemical formula (4) or (5), or the poly(2,5-benzimidazole) represented by chemical formula (6).

[Formula 1]

(4)

Here, R represents,

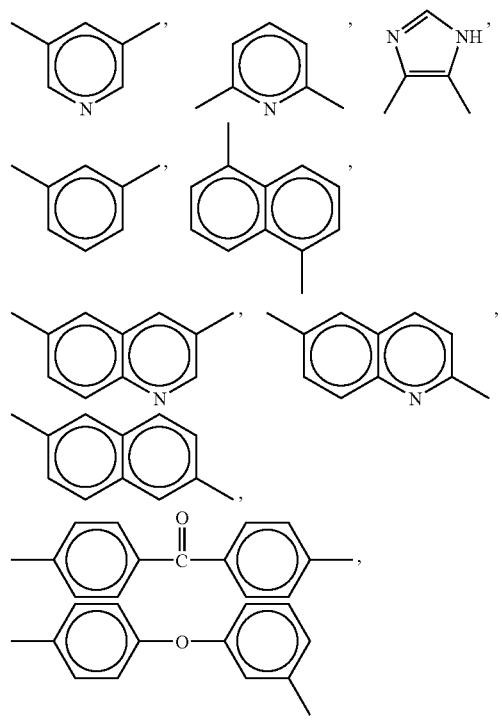

and an alkylene chain, or a divalent group such as a fluoroalkylene chain.

Here, each $R^1$ independently represents a hydrogen atom, alkyl, phenyl, or pyridyl.

Further, in the above formula, "x" denotes a number from 10 or more to $1.0 \times 10^7$ or less.

[Formula 2]

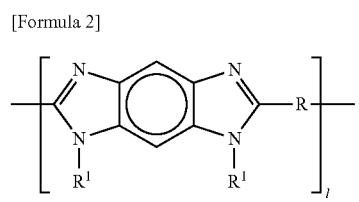

(5)

In the formula, "l" denotes a number from 10 or more to $1.0 \times 10^7$ or less, and R and $R^1$ is defined in the same manner as in chemical formula (4) of the above [Formula 1].

[Formula 3]

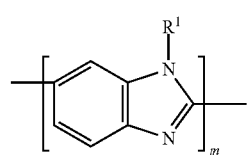

(6)

In the formula, "m" denotes a number from 10 or more to $1.0 \times 10^7$ or less, and $R^1$ is defined in the same manner as in chemical formula (4) of the above [Formula 1].

Among the above-described polybenzimidazole, especially preferable is the poly[2,2'-(m-phenylene)-5,5'-bibenzimidazole] represent by chemical formula (7) of the following [Formula 4].

[Formula 4]

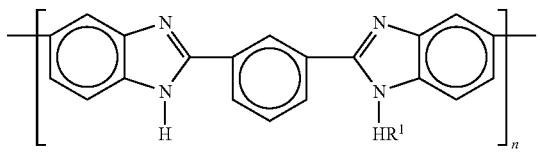

(7)

In the formula, "n" denotes a number from 10 or more to $1.0 \times 10^7$ or less.

Except for the following compounds referred to as "polyazole salts", in the present specification the polyazole-based compounds are referred to as "polyazole" (component B').

The polyazole-based compound in the present invention is preferably a salt wherein at least a part of the polyazole-based compound is ionically bonded to a cation. In the present specification, a polyazole-based compound in such a state is referred to as a "polyazole salt".

The cation is not especially limited, but is preferably a metal ion or an amine.

The term "amine" refers to a compound represented by $N^+R_1R_2R_3R_4$ (wherein $R_1$, $R_2$, $R_3$, and $R_4$ represent hydrogen or a hydrocarbon group; among hydrocarbon groups, an aliphatic group is preferable, and an alkyl group is especially preferable; and each of $R_1$, $R_2$, $R_3$, and $R_4$ may be the same or different). Specific examples include $NH_4^+$, $N^+(CH_3)H_3$, $N^+(C_2H_5)H_3$, $N^+(CH_3)_2H_2$, $N^+(C_2H_5)_2H_2$, $N^+(CH_3)_3H$, $N^+(C_2H_5)_3H$, $N^+(CH_3)_4$, and $N^+(C_2H_5)_4$ The "metal ion" is preferably a monovalent alkali metal ion such as $Li^+$, $Na^+$, $K^+$, $Rb^+$, $Cs^+$, $Fr^+$, a divalent alkali earth metal ion such as $Mg^{2+}$, $Ca^{2+}$, $Ba^{2+}$, a transition metal ion such as $Fe^{2+}$, $Co^{2+}$, $Ni^{2+}$, $Cu^{2+}$, a rare earth metal ion such as $La^{2+}$, or a semimetal ion such as $Si^{4+}$. More preferably, the metal ion is an alkali metal ion, and among such ions $Na^+$ is most preferred. In the present specification, a polyazole salt which is ionically bonded to such an alkali metal ion is referred to as "polyazole alkali metal salt".

If the polyazole-based compound is a polyazole salt, based on the total equivalent number of nitrogen in the heterocyclic ring of the polyazole compound, the cation content is preferably 0.01 to 100 times equivalents thereof (0.01 times equivalents or more to 100 times equivalents or less), more preferably, 0.05 to 50 times equivalents thereof, and most preferably, 0.1 to 10 times equivalents thereof.

The total weight of the perfluorocarbon sulfonic acid resin and the polyazole-based compound in the highly durable electrode catalyst layer according to the present invention is 5 to 80% by weight, preferably, 10 to 60% by weight, more preferably, 15 to 50% by weight, and most preferably, 20 to 40% by weight.

The weight ratio (A/B) between the perfluorocarbon sulfonic acid resin (component A) and the polyazole-based compound (component B) in the highly durable electrode catalyst layer according to the present invention is 1 to 199, preferably, 2 to 499, more preferably, 5.6 to 199, and most preferably, 19 to 199.

The state of the perfluorocarbon sulfonic acid resin and the polyazole-based compound may be, for example, the state in which these components have simply been physically mixed, or the state in which at least a part of each component has reacted each other (e.g. the state of an acid-base ion complex formed by ionic bonding, or the covalently bonded state).

Here, the state in which these components have simply been physically mixed refers to the state wherein the polyazole-based compound is a powder which is dispersed in the electrode catalyst layer. Here, the term "powder" refers to what is defined in JIS Z 2500, and thus includes powders having a granular, fibrous, angular, branched, flake-like, irregular, teardrop or spherical shape.

If the polyazole-based compound is dispersed as a powder in the electrode catalyst layer, its average particle size is preferably 0.01 to 100 μm, more preferably, 0.1 to 20 μm, even more preferably, 0.5 to 15 μm, and most preferably, 1 to 10 μm. If the polyazole-based compound has a fibrous shape, the minor axis is preferably 0.01 to 100 μm, more preferably, 0.1 to 20 μm, even more preferably, 0.5 to 15 μm, and most preferably, 1 to 10 μm. Further, the aspect ratio between major axis and minor axis is preferably 1 to 10,000, more preferably, 1.2 to 1,000, even more preferably, 1.5 to 100, and most preferably, 2 to 10.

The highly durable electrode catalyst layer according to the present invention further comprises a composite particle in which an electrode catalyst particle is supported on a conductive particle. The electrode catalyst oxidizes a fuel (e.g. hydrogen) at the anode to allow protons to be easily generated. At the cathode, the catalyst reacts protons, electrons and an oxidant (e.g. oxygen or air) to generate water. While the kind of electrode catalyst is not limited, platinum can be preferably used. To strengthen the resistance of the platinum to impurities such as carbon monoxide, in some cases an electrode catalyst can be preferably used in which ruthenium has been added to or alloyed with platinum.

The conductive particle can be any kind of particle as long as it is conductive. For example, carbon black such as furnace black, channel black and acetylene black; activated carbon; graphite; and various metals can be used for the conductive particles. The particle size of the conductive particles is preferably 10 angstroms to 10 μm, more preferably, 50 angstroms to 1 μm, and most preferably, 100 to 5,000 angstroms. The particle size of the electrode catalyst particles is not limited, but is preferably 10 to 1,000 angstroms, more preferably, 10 to 500 angstroms, and most preferably, 15 to 100 angstroms.

The composite particle is preferably such that, based on a conductive particle, 1 to 99% by weight, more preferably, 10 to 90% by weight, and most preferably, 30 to 70% by weight of the electrode catalyst particle is supported. Specifically, preferable examples include a platinum catalyst-loaded carbon, such as the commercially available "F101R/W" manufactured by Degussa, and "TEC10E40E" manufactured by Tanaka Kikinzoku Kogyo K.K., Japan.

The content of the composite particle in the highly durable electrode catalyst layer according to the present invention is 20 to 95% by weight, and preferably, 40 to 90% by weight, more preferably, 50 to 85% by weight, and most preferably, 60 to 80% by weight.

The loading amount of the electrode catalyst in relation to the electrode surface area is, in the state such that the electrode catalyst layer has been formed, preferably 0.001 to 10 mg/cm², more preferably, 0.01 to 5 mg/cm², and most preferably, 0.1 to 1 mg/cm².

Further, the highly durable electrode catalyst layer according to the present invention preferably has a structure in which the composite particle is bound by a perfluorocarbon sulfonic acid resin and a polyazole compound.

The thickness of the highly durable electrode catalyst layer according to the present invention is preferably 0.01 to 200 μm, more preferably, 0.1 to 100 μm, and most preferably, 1 to 50 μm.

The void ratio of the highly durable electrode catalyst layer according to the present invention is not especially limited, but is preferably 10 to 90% by volume, more preferably, 20 to 80% by volume, and most preferably, 30 to 60% by volume.

To improve water repellency, the highly durable electrode catalyst layer according to the present invention may further contain polytetrafluoroethylene (hereinafter, "PTFE"). In such case, the shape of the PTFE is not especially limited as long as it is stable, although granular or fibrous shape is preferable. These shapes may be used alone or mixed together.

If including PTFE in the highly durable electrode catalyst layer according to the present invention, the PTFE content is preferably 0.001 to 20% by weight, more preferably, 0.01 to 10% by weight, and most preferably, 0.1 to 5% by weight.

To improve hydrophilicity, the highly durable electrode catalyst layer according to the present invention may further contain a metal oxide. In such a case, the metal oxide is not especially limited, but is preferably a metal oxide having at least one constituent element selected from the group consisting of $Al_2O_3$, $B_2O_3$, MgO, $SiO_2$, $SnO_2$, $TiO_2$, $V_2O_5$, $WO_3$, $Y_2O_3$, $ZrO_2$, $Zr_2O_3$ and $ZrSiO_4$. Of these, $Al_2O_3$, $SiO_2$, $TiO_2$, and $ZrO_2$ are preferred, and $SiO_2$ is especially preferred.

In the case where the highly durable electrode catalyst layer according to the present invention contains a metal oxide, the metal oxide content is preferably 0.001 to 20% by weight, more preferably, 0.01 to 10% by weight, and most preferably, 0.1 to 5% by weight, based on the total weight of the electrode catalyst layer. The shape of the metal oxide may be as particulate or fibrous, although a non-defined shape is especially preferable. The term "non-defined shape" as used here refers to the state where no particulate or fibrous metal oxide is observed even when viewed with an optical microscope or an electron microscope. In particular, this term refers to the state where no particulate or fibrous metal oxide is observed even when the electrode catalyst layer is viewed with a scanning electron microscope (SEM) at a magnification of hundred thousands. This term also refers to the state where no particulate or fibrous metal oxide can be clearly observed even when the electrode catalyst layer is viewed with a transmission electron microscope (TEM) at a magnification of hundred thousands to millions. Thus, the term "non-defined shape" refers to the state where no particulate or fibrous metal oxide can be confirmed within the limits of existing microscope technology.

Next, the method for producing the highly durable electrode catalyst layer according to the present invention will be described.

(Highly Durable Electrode Catalyst Layer Production Method 1)

The highly durable electrode catalyst layer according to the present invention can be produced by, for example, preparing an electrolytic polymer solution comprising a perfluorocarbon sulfonic acid resin (component A) having an ion exchange capacity of 0.5 to 3.0 milliequivalents/g, a polyazole (component B'), and as desired an alkali metal hydroxide (component C) which are dissolved or dispersed in a protic solvent, the total weight of component A and component B' being 0.5 to 30% by weight, the weight % of component C being 0.001 to 5% by weight as desired, and the weight ratio (A/B') between component A and component B' being 1 to 999; preparing an electrode catalyst composition in which the above-described composite particle is dispersed in the electrolytic polymer solution; coating this electrode catalyst composition onto a polymer electrolyte membrane or some other substrate such as a PTFE sheet; and then drying and solidifying the composition. In the present invention, the coating of the electrode catalyst composition can be carried out by various commonly known processes, such as screen printing and spraying.

The electrode catalyst composition may be further charged with a solvent as necessary. Examples of solvents which can be used include a single solvent such as water, alcohols (e.g. ethanol, 2-propanol, ethylene glycol and glycerin) and chlorofluorocarbon or a mixed solvent thereof. The added amount of such solvent is preferably 0.1 to 90% by weight, more preferably, 1 to 50% by weight, and most preferably, 5 to 20% by weight, based on the total weight of the electrode catalyst composition.

The highly durable electrode catalyst layer according to the present invention can also be obtained by coating, or dipping and coating, the electrolytic polymer solution onto a gas diffusion electrode, such as ELAT™ (manufactured by De Nora North America, U.S.A.), in which a gas diffusion layer and an electrode catalyst layer are layered together, and then by drying and solidifying it.

In addition, after the electrode catalyst layer has been produced, the layer may also be dipped in an inorganic acid such as hydrochloric acid. The acid treatment temperature is preferably 5 to 90° C., more preferably, 10 to 70° C., and most preferably, 20 to 50° C.

The electrolytic polymer solution used in the production of the highly durable electrode catalyst layer according to the present invention will be described below.

The ion exchange capacity of the perfluorocarbon sulfonic acid resin in the electrolytic polymer solution is preferably 0.5 to 3.0 milliequivalents/g, more preferably, 0.9 to 2.0 milliequivalents/g, and most preferably, 1.0 to 1.5 milliequivalents/g.

The total weight of the perfluorocarbon sulfonic acid resin and the polyazole in the electrolytic polymer solution is preferably 0.5 to 30% by weight, more preferably, 1 to 25% by weight, even more preferably, 2 to 20% by weight, and most preferably, 5 to 15% by weight.

The weight ratio (A/B') between the perfluorocarbon sulfonic acid resin (component A) and the polyazole (component B') in the electrolytic polymer solution is 1 to 999, preferably, 2 to 499, more preferably, 5.6 to 199, and most preferably, 19 to 199.

Examples of the alkali metal hydroxide optionally contained in the electrolytic polymer solution include monovalent alkali metal hydroxides, such as LiOH, NaOH, KOH, RbOH, CsOH, FrOH. Among these examples, NaOH is most preferable. The alkali metal hydroxide content in the electrolytic polymer solution is preferably 0.001 to 5% by weight, more preferably, 0.002 to 2% by weight, even more preferably, 0.005 to 1% by weight, and most preferably, 0.01 to 0.1% by weight.

The protic solvent constituting the electrolytic polymer solution refers to a solvent which is dissociated to easily emit protons, for example, water, alcohols, carboxylic acids or fatty acids. Examples of the protic solvent will be listed below, but are not limited thereto as far as they are solvents which are dissociated to easily emit protons. Protic solvents other than water are referred to as protic organic solvents in the present specification. Examples of the protic solvent include water; aliphatic alcohols such as methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 3-methyl-2-butanol, neopentyl alcohol, 1-hexanol, 2-methyl-1-pentanol, 4-methyl-2-pentanol, 2-ethyl-1-butanol, 1-heptanol, 2-heptanol, 3-heptanol, 1-octanol, 2-octanol, 2-methyl-1-hexanol, 1-nonanol, 3,5,5-trimethyl-1-hexanol, 1-decanol, 1-undecanol, 1-dodecanol, allyl alcohol, propargyl alcohol, benzyl alcohol, cyclohexanol, 1-methylcyclohexanol, 2-methylcyclohexanol, 3-methylcyclohexanol, 4-methylcyclohexanol, α-terpineol, abietinol and fusel oil; solvents having two or more functional groups such as 2-methoxyethanol, 2-ethoxyethanol, 2-(methoxymethoxy)ethanol, 2-isopropoxyethanol, 2-butoxyethanol, 2-(isopentyloxy)ethanol, 2-(hexyloxy)ethanol, 2-phenoxyethanol, 2-(benzyloxy)ethanol, furfuryl alcohol, tetrahydrofurfuryl alcohol, diethylene glycol, diethylene glycol monomethyl ether, diethylene glycol monoethyl ether, diethylene glycol monobutyl ether, triethylene glycol, triethylene glycol monomethyl ether, tetraethylene glycol, polyethylene glycol, 1-methoxy-2-propanol, 1-ethoxy-2-propanol, dipropylene glycol, dipropylene glycol monomethyl ether, dipropylene glycol monoethyl ether, tripropylene glycol monomethyl ether, polypropylene glycol, diacetone alcohol, 2-chloroethanol, 1-chloro-2-propanol, 3-chloro-1,2-propanediol, 1,3-dichloro-2-propanenol, 2,2,2-trifluoroethanol, 3-hydroxypropiononitrile and 2,2'-thiodiethanol; diols such as 1,2-ethanediol, 1,2-propanediol, 1,3-propanediol, 1,2-butanediol, 1,3-butanediol, 1,4-butanediol, 2,3-butanediol, 1,5-pentanediol, 2-butene-1,4-diol, 2-methyl-2,4-pentanediol, 2-ethyl-1,3-hexanediol, glycerin, 2-ethyl-2-(hydroxymethyl)-1,3-propanediol and 1,2,6-hexanetriol; phenols such as phenol, cresol, o-cresol, m-cresol, p-cresol and xylenols; fatty acid solvents such as formic acid, acetic acid, propionic acid, butyric acid, isobutyric acid, pivalic acid, valeric acid, isovaleric acid, caproic acid, 2-ethylbutyric acid, caprylic acid, 2-ethylhexanoic acid and oleic acid; and inorganic acids such as sulfuric acid, nitric acid and hydrochloric acid.

Next, the perfluorocarbon sulfonic acid resin constituting the above-described electrolytic polymer solution, and the solution comprising a perfluorocarbon sulfonic acid resin dissolved in a protic solvent will be described.

Perfluorocarbon sulfonic acid resins which can be used in the present invention are obtained by hydrolyzing a perfluorocarbon sulfonic acid resin precursor represented by the following general formula (8),

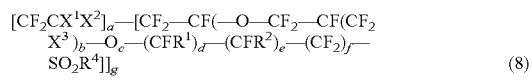

$[CF_2CX^1X^2]_a—[CF_2—CF(—O—CF_2—CF(CF_2X^3)_b—O_c—(CFR^1)_d—(CFR^2)_e—(CF_2)_f—SO_2R^4]]_g$ (8)

wherein $X^1$, $X^2$ and $X^3$ each independently represent a halogen or a perfluoroalkyl group having 1 to 3 carbon atoms, $0 \leq a < 1$, $0 < g \leq 1$, $a+g=1$, "b" is a number from 1 to 8, "c" denotes 0 or 1, "d", "e" and "f" each independently denotes a number in the range of 0 to 6 (however, d+e+f does not equal 0), $R^1$ and $R^2$ each independently represents a halogen or a perfluoroalkyl group or a fluorochloroalkyl group having 1 to 10 carbon atoms, and $R^4$ represents a halogen.

The precursor polymer represented by the above formula (8) can be produced by copolymerizing a fluorinated olefin and a fluorinated vinyl compound. Specific examples of the fluorinated olefin include $CF_2=CF_2$, $CF_2=CFCl$, $CF_2=CCl_2$ and the like. Specific examples of the fluorinated vinyl compound include $CF_2=CFO(CF_2)_z—SO_2F$, $CF_2=CFOCF_2CF(CF_3)O(CF_2)_z—SO_2F$, $CF_2=CF(CF_2)_z—SO_2F$, $CF_2=CF(OCF_2CF(CF_3))_z—(CF_2)_z-1-SO_2F$, $CF_2=CFO(CF_2)_z—CO_2R$, $CF_2=CFOCF_2—CF(CF_3)O(CF_2)_z—CO_2R$, $CF_2=CF(CF_2)_z—CO_2R$, and $CF_2=CF(OCF_2CF(CF_3))_z—(CF_2)_2—CO_2R$ (wherein "Z" denotes an integer from 1 to 8; and "R" represents an alkyl group (not substituted with fluorine) having 1 to 3 carbon atoms).

Examples of the polymerization method for such a precursor polymer include: solution polymerization in which polymerization is carried out by dissolving a fluorinated vinyl compound in a solvent such as chlorofluorocarbon, and then reacting the resultant solution with tetrafluoroethylene gas; weight polymerization in which polymerization is carried out without using a solvent such as chlorofluorocarbon; and emulsion polymerization in which polymerization is carried out by charging a fluorinated vinyl compound and a surfactant in water whereby the solution is emulsified, and then reacting the resultant solution with tetrafluoroethylene gas. In all of these polymerization methods, the reaction temperature is preferably 30 to 90° C., and the reaction pressure is preferably 280 to 1,100 kPa.

The melt index MI (g/10 min.) of such a produced precursor polymer as measured in accordance with JIS K-7210 at 270° C., a load of 2.16 kgf and an orifice inner diameter of 2.09 mm, is not especially limited, but is preferably 0.001 or more to 1,000 or less, more preferably, 0.01 or more to 100 or less, and most preferably, 0.1 or more to 10 or less.

The thus-produced perfluorocarbon sulfonic acid resin precursor is extruded and molded by a nozzle, a die or the like using an extrusion molder. The molding method and shape of the molded body are not especially limited, but in order to speed up the below-described hydrolysis treatment and acid treatment, the molded body is preferably a pellet shape of no greater than 0.5 cm³.

The thus-molded precursor polymer is dipped in a basic reaction solution to undergo a hydrolysis treatment at 10 to 90° C. for 10 seconds to 100 hours. The basic reaction solution is not especially limited, but an aqueous solution of an alkali metal or alkali earth metal hydroxide, such as potassium hydroxide or sodium hydroxide, is preferable. The alkali metal or alkali earth metal hydroxide content is not especially limited, but 10 to 30% by weight based on the weight of the basic reaction solution is preferable. The basic reaction solution preferably contains a swellable organic compound such as dimethylsulfoxide or methyl alcohol. The swellable organic compound content in the basic reaction solution is preferably 1 to 30% by weight based on the weight of the basic reaction solution.

After carrying out this hydrolysis treatment, the perfluorocarbon sulfonic acid resin is produced by further carrying out an acid treatment. The ion exchange capacity of the perfluorocarbon sulfonic acid resin is not especially limited, but is preferably 0.5 to 3.0 milliequivalents per gram, more preferably, 0.9 to 2.0 milliequivalents, and most preferably, 1.0 to 1.5 milliequivalents.

The perfluorocarbon sulfonic acid resin protonated by the acid treatment is dissolved using the above-described protic solvent.

The dissolution method includes adding the perfluorocarbon sulfonic acid resin to a solvent selected from water and the above protic organic solvents so that the solid content concentration is 1 to 50% by weight, putting the solution into an autoclave (if necessary, this autoclave may have a glass inner cylinder), purging the air in the vessel with an inert gas such as nitrogen, then heating to an inner temperature of 50 to 250° C. for 1 to 12 hours and stirring. As the concentration of the perfluorocarbon sulfonic acid resin is higher, the yield is better. However, when the concentration of the perfluorocarbon sulfonic acid resin is increased, undissolved material may be produced. Therefore, the concentration is preferably 1 to 30% by weight, and more preferably, 3 to 20% by weight.

The solvent used to dissolve the perfluorocarbon sulfonic acid resin may be a single solvent selected from water and the above-described protic organic solvents, and is preferably water alone. A mixed solvent consisting of two or more of them may also be used. In the case of using a mixed solvent, a mixed solvent of water and a protic organic solvent are particularly preferable.

The mixing ratio of water to protic organic solvent can vary depending on the dissolution method, dissolution conditions, kind of perfluorocarbon sulfonic acid resin, solid content of the perfluorocarbon sulfonic acid resin, dissolution temperature and stirring rate. However, the weight ratio of protic organic solvent to water is preferably from 0.1 to 10 of protic organic solvent to 1 of water, and particularly preferably from 0.1 to 5 of protic organic solvent to 1 of water.

When only water is used as the solvent, it is more effective to perform the dissolution method in an autoclave having an inner temperature of 180 to 250° C. When using this method, the amount of a decomposed product of the organic solvent and viscosity of the solution after dissolution can be decreased, and the solution can be made more uniform, thus allowing handling at high concentration. While there is no undissolved matter even if the perfluorocarbon sulfonic acid resin content at this stage is 1 to 50% by weight, the content is preferably 1 to 40% by weight in order to further increase the uniformity of the solution.

The method for producing a solution of the perfluorocarbon sulfonic acid resin according to the present invention was described above.

Next, the perfluorocarbon sulfonic acid resin solution may be added to a solution obtained by dissolving the polyazole and alkali metal hydroxide in a protic solvent to prepare an electrolytic polymer solution. This method will be described below.

For the polyazole dissolution, a protic solvent consisting of a mixture of an organic solvent, such as methanol, ethanol, n-propanol, isopropyl alcohol, butanol or glycerin, and water, can be used. However, as long as the solvent has good affinity with the polyazole-based compound, the solvent is not limited to the above solvents.

To increase solubility, the dissolution temperature is preferably as high as possible, and 10 to 160° C. is preferable. If the dissolution temperature is higher than the boiling point of water and the organic solvent, the use an autoclave is preferable. It is preferred to dissolve while stirring normally.

The alkali metal hydroxide can be dissolved using the same solvent as that for the polyazole compound.

In the present invention, the alkali metal hydroxide may be directly added to the polyazole solution, or a solution of the alkali metal hydroxide may be added to the polyazole solution. The latter method is preferable in terms of uniform mixing.

When mixing the polyazole compound and the alkali metal hydroxide, the amount of the alkali metal hydroxide to be added is preferably 1 to 100 times equivalents (1 equivalents or more to 100 equivalents or less) based on total equivalents of nitrogen atoms which are present in the heterocyclic ring of the polyazole compound. If the amount is less than this, undissolved material will remain. On the other hand, if the amount is more than this, although solubility of the polyazole compound is improved, the alkali metal hydroxide is precipitated. More preferably, the amount of the alkali metal hydroxide is 2 to 100 times equivalents.

Regarding the composition of the entire solution, in terms of weight ratio, the alkali metal hydroxide is preferably 0.005 to 2, the protic organic solvent 10 to 500 and water 0.05 to 50, based on 1 of polyazole compound.

If the amount of the protic organic solvent is less than this, undissolved polyazole will remain, which worsens dispersibility. If the amount is too large, the concentration of the polyazole compound is decreased and productivity is lowered. The added amount of water can vary depending on the added amount of the alkali metal hydroxide. The alkali metal hydroxide can be added in the form of an aqueous solution.

In the present invention, an electrolytic polymer solution is prepared by adding a solution of the above-described perfluorocarbon sulfonic acid resin to the thus-obtained mixed solution consisting of the polyazole compound and the alkali metal hydroxide used in the protic solvent. The preparation procedure will be described below.

In the present invention, addition rate when adding the perfluorocarbon sulfonic acid resin solution to the mixed solution consisting of the polyazole compound and the alkali metal hydroxide is preferably as slow as possible in order to obtain high dispersion/solubility of the polyazole. The addition rate is preferably no greater than 20 ml/min, more preferably no greater than 10 ml/min.

In the present invention, in order to enhance uniformity of the electrolytic polymer solution containing a high concentration of the perfluorocarbon sulfonic acid resin, it is preferred to add the perfluorocarbon sulfonic acid resin solution to the mixed solution of the polyazole compound and the alkali metal hydroxide in twice.

Specifically, it is possible to mix the components by a first mixing step of adding a solution obtained by dissolving a perfluorocarbon sulfonic acid resin (component A) having an ion exchange capacity of 0.5 to 3.0 milliequivalents/g in a protic solvent to a solution obtained by dissolving a polyazole compound (component B') and an alkali metal hydroxide (component C) in the amount of 1 to 100 times equivalents per equivalent of nitrogen atoms in the polyazole-based compound so that the weight ratio (A/B') of component A to component B' is 0.1 to 198, followed by mixing with stirring; and a second mixing step of adding a solution obtained by dissolving the component A in a protic solvent so that the final weight ratio (A/B') of component A to component B' is 1 to 999 and the total weight of component A and component B is 0.5 to 30% by weight, followed by mixing with stirring.

It is also possible to add a solution prepared by using water having high solubility in a perfluorocarbon sulfonic acid resin as a main solvent and increasing the concentration of the perfluorocarbon sulfonic acid resin to the mixed solution consisting of the polyazole compound and the alkali metal hydroxide. It is preferred to thoroughly stir, in the case of adding the solution, so as to obtain a uniformly dispersed solution. The stirring temperature is not especially limited, although if the temperature is too high, the polyazole-based compound non-uniformly precipitates. On the other hand, if the temperature is too low, viscosity increases and the uniform stirring cannot be conducted. Therefore, the stirring temperature is preferably from −10 to 100° C., and more preferably, from 10 to 50° C.

The method for producing an electrolytic polymer solution which can be used in the present invention was described above.

In the present invention, the electrolytic polymer solution itself can be concentrated. Examples of the concentration method include, but are not limited to, vaporizing the solvent by heating, and concentrating under reduced pressure. As a result of concentration, if the total solid content of the polyazole-based compound and the perfluorocarbon sulfonic acid resin in the resulting electrolytic polymer solution is too large, viscosity increases and thus it becomes difficult to handle. On the other hand, if the solid content is too small, productivity is lowered. Therefore, the solid content of the final electrolytic polymer solution is preferably 0.501 to 35% by weight.

The electrolytic polymer solution may be in a state such that a part of the perfluorocarbon sulfonic acid resin has reacted with a part of the polyazole-based compound (e.g. the state of an acid-base ion complex formed by ionic bonding, or the covalently bonded state).

Examples of the above states include cases where a sulfonic acid group of the perfluorocarbon sulfonic acid resin is ionically or covalently bonded to a nitrogen atom in the respective reactive group in the polyazole compound, such as imidazole group, oxazole group and thiazole group.

It is possible to confirm whether or not a part of the perfluorocarbon sulfonic acid resin is reacted with a part of the polyazole-based compound by using a Fourier-transform infrared spectrometer (hereinafter, "FT-IR"). If a peak shifted from the intrinsic peaks of the perfluorocarbon sulfonic acid resin and the polyazole-based compound is observed during FT-IR measurement, it can be considered that a part of the perfluorocarbon sulfonic acid resin has reacted with a part of the polyazole-based compound. For example, if poly[2,2'-(m-phenylene)-5,5'-benzoimidazole] (hereinafter, "PBI") is used as the polyazole-based compound, shifted absorption peaks deriving from a chemical bond between a sulfone group in the perfluorocarbon sulfonic acid resin and an imidazole group in the PBI are observed at about 1458 $cm^{-1}$, 1567 $cm^{-1}$ or 1634 $cm^{-1}$. This chemical bond binds a part of the perfluorocarbon sulfonic acid resin, exerts the effect of a crosslink point, and contributes to an improvement in chemical stability. It is thus considered that it ultimately exhibits an effect on the expression of durability during operation of the cell.

(Highly Durable Electrode Catalyst Layer Production Method 2)

The highly durable electrode catalyst layer according to the present invention, which is characterized by comprising a powder of a polyazole-based compound having an average particle size of 0.01 to 100 μm, and/or a composite powder consisting of a perfluorocarbon sulfonic acid resin and a polyazole-based compound, can be produced by, for example, dispersing the above-described composite particle in a solution of the above-described perfluorocarbon sulfonic acid resin, then adding the powder of polyazole-based compound, and/or composite powder consisting of a perfluorocarbon sulfonic acid resin and a polyazole-based compound, mixing the resultant mixture and preparing the electrode catalyst composition, coating this electrode catalyst composition onto a polymer electrolyte membrane or some other substrate such as a PTFE sheet, and then drying and solidifying the composition.

The powder of polyazole-based compound and composite powder consisting of a perfluorocarbon sulfonic acid resin and a polyazole-based compound have an average particle size of 0.01 to 100 μm, preferably, 0.1 to 20 μm, more preferably, 0.5 to 15 μm, and most preferably, 1 to 10 μm. If the powder has a fibrous shape, the minor axis is preferably 0.01 to 100 μm, more preferably, 0.1 to 20 μm, even more preferably, 0.5 to 15 μm, and most preferably, 1 to 10 μm. Further, the aspect ratio between major axis and minor axis is preferably 1 to 10,000, more preferably, 1.2 to 1,000, even more preferably, 1.5 to 100, and most preferably, 2 to 10.

Examples of the method for producing the powder of polyazole-based compound include preparing a polymer solution containing the above-described polyazole-based compound, and then suddenly volatizing the solvent by a spray drying method (see JIS Z 2500) to cause the polyazole-based compound to finely precipitate and solidify. In addition, the above polyazole-based compound can be prepared by a well-known pulverizing technique or classifying technique as necessary.

For example, if the polyazole-based compound is a polyazole, it is preferable to use a polymer solution in which the polyazole is dissolved in dimethylacetamide. The polyazole concentration in the polymer solution is preferably 0.1 to 10% by weight, more preferably, 0.5 to 9% by weight, even more preferably, 1 to 8% by weight, and most preferably, 4 to 6% by weight.

Further, if the polyazole compound is a polyazole metal salt, it is preferable to use a mixed solution using the protic solvent of the polyazole and the alkali metal hydroxide such as that described above.

The composite powder consisting of the perfluorocarbon sulfonic acid resin and polyazole-based compound can also be produced in the same manner as the above-described production method of the powder of polyazole-based compound.

If the composite powder is a composite powder consisting of the perfluorocarbon sulfonic acid resin and a polyazole metal salt, the above-described electrolytic polymer solution can also be produced by spray drying.

In addition, if the composite powder is a composite powder consisting of the perfluorocarbon sulfonic acid resin and polyazole, the composite powder can be obtained by spray drying a polymer solution in which both of the perfluorocarbon sulfonic acid resin and polyazole are dissolved in dimethylacetamide. The solid content of this polymer solution is preferably 0.1 to 10% by weight, more preferably, 0.5 to 9% by weight, even more preferably, 1 to 8% by weight, and most preferably, 4 to 6% by weight. The weight ratio of the perfluorocarbon sulfonic acid resin to the polyazole in the polymer solution is preferably 0.01 to 100, more preferably, 0.05 to 50, even more preferably, 0.1 to 10, and most preferably, 0.5 to 1, based on 1 of the polyazole.

(Membrane Electrode Assembly)

If the highly durable electrode catalyst layer according to the present invention is used in a solid polymer fuel cell, the highly durable electrode catalyst layer is used as a membrane electrode assembly (as described above, this is often abbreviated to "MEA") with the polymer electrolyte membrane is in close contact with between an anode and a cathode and is supported therebetween. Here, the anode comprises an anode catalyst layer and is proton conductive, and the cathode comprises a cathode catalyst layer and is proton conductive. Further, the case where a gas diffusion layer (described below) is joined to the outer surface of both the anode catalyst layer and the cathode catalyst layer is also referred to as an MEA. The highly durable electrode catalyst layer according to the present invention is used as the anode catalyst layer and/or the cathode catalyst layer.

Next, the polymer electrolyte membrane will be described. Any polymer electrolyte membrane can be used as long as it has proton conductivity. Examples of the polymer electrolyte membrane include electrolyte membranes consisting of a resin which introduces a sulfonic acid group or a carboxylic acid group into a polymer having a hydrocarbon moiety, such as polyether sulfone resin, polyether ether ketone resin, phenol-formaldehyde resin, polystyrene resin, polytrifluorostyrene resin, trifluorostyrene resin, poly(2,3-diphenyl-1,4-phenylene oxide resin, poly(allyl ether ketone) resin, poly(allyl ether sulphone) resin, poly(phenylquinoxaline) resin, poly(benzylsilane) resin, polystyrene-graft-ethylene tetrafluoroethylene resin, polystyrene-graft-polyfluorinated vinylidene resin, polystyrene-graft-tetrafluoroethylene resin, polyimide resin and polybenzimidazole resin. Perfluorinated proton exchange membranes as represented by a perfluorocarbon sulfonic acid resin are preferable.

The ion exchange capacity of this polymer electrolyte membrane is not especially limited, but is preferably 0.5 to 3.0 milliequivalents per gram, more preferably, 0.9 to 2.0 milliequivalents per gram, and most preferably, 1.0 to 1.5 milliequivalents per gram. When using a polymer electrolyte membrane having a greater ion exchange capacity, higher proton conductivity is exhibited under high temperature and low humidity conditions, and in the case of using this membrane in a fuel cell, higher output power can be obtained during operation. While the thickness of the polymer electrolyte membrane is not especially limited, the thickness is preferably 1 to 500 μm, more preferably 2 to 150 μm, even more preferably 5 to 75 μm, and most preferably 5 to 50 μm. As the membrane is thicker, the durability becomes better. In this case, however, although since initial properties deteriorate, it is preferable to set the membrane thickness within the above-described range.

The most preferable polymer electrolyte membrane is a highly durable polymer electrolyte membrane which consists of 50.00 to 99.99% by weight of a perfluorocarbon sulfonic acid resin and 0.01 to 50.00% by weight of a polyazole-based compound. The perfluorocarbon sulfonic acid resin content in such a polymer electrolyte membrane is preferably 80.00 to 99.99% by weight, more preferably, 85.0 to 99.9% by weight, even more preferably, 90.0 to 99.5% by weight, and most preferably, 95 to 99% by weight. The polyazole-based compound content in such a polymer electrolyte membrane is preferably 0.01 to 20.00% by weight, more preferably, 0.1 to 15.0% by weight, even more preferably, 0.5 to 10.0% by weight, and most preferably, 1 to 5% by weight.

This highly durable polymer electrolyte membrane can be formed using the above-described electrolytic polymer solution.

The membrane formation method can be performed by casting onto a petri dish, glass plate or a film while controlling the membrane thickness by using an apparatus such as a blade coater, gravure coater or comma coater equipped with a mechanism such as a blade, air knife or reverse roll so that the thickness of the polymer solution is uniform. This can also provide sheet-like coated membrane. In the case of a lengthy film, it is also possible to form a continuous membrane by continuous casting. Further, an extrusion membrane formation method for forming a membrane by extruding a coating solution through a die can also be employed, and a sheet-like or continuous membrane can be formed by the extrusion membrane formation method. It is also possible to control the thickness of the membrane again with a blade or an air knife before subjecting the membrane formed by casting or extrusion to a drying treatment described hereinafter. Solvent which is present in the thus-formed membrane can be removed by a solvent dipping method, in which solvent is removed by putting the membrane into a proper solution or solvent.

The membrane formation method is not limited to what is described above, and can be selected in accordance with the viscosity of the solution or other aspects. In terms of controlling the thickness of the membrane, it is preferable to subject the electrolytic polymer solution to a pretreatment such as removal of bubbles by a vacuum degassing method before forming the membrane.

In the present invention, the membrane formed by the above procedure is dried by heating at the below-described temperature. When the solvent is removed from the coated membrane by drying with heating, a dry coated membrane, that is, a polymer electrolyte membrane is obtained. The heat-drying temperature is preferably from 40 to 250° C. If the temperature is too high or if the heating is rapid, bubbles and thickness unevenness occurs during drying, whereby a normal polymer electrolyte membrane having uniform thickness accuracy cannot be obtained. If the heat-drying temperature is too low, the drying time is extended and productivity is lowered. This heat-drying may be also conducted in two or three stages. In this initial stage an electrolyte membrane having uniform thickness is obtained, and then the membrane is heated at higher temperatures thereafter. When using this method, by keeping the heating temperature low during the initial stage and extending the heating time, an electrolyte membrane which is free from dry mottles and has a high degree of flatness can be obtained. While drying will occur in, for example, hot air or low humidity air, the heat-drying process can be conducted while being restricted by a tenter or a metal frame, or without being restricted by it. For example, drying can be conducted on a support on which the electrolyte membrane does not adhere or by using a floating method utilizing an air flow.

The polymer electrolyte membrane obtained by the above-described method turns into a uniform membrane which exhibits a yellow or brown color by subjecting it to the heat-drying treatment. If the polymer electrolyte membrane has insufficient mechanical strength, porous metal films or belts, or films or belts made of a polymer material such as polyethylene terephthalate, polyaramid, polyimide and polyethylene naphthalate can be used as a support regardless of whether the membrane is a continuous or sheet-like membrane.

The polymer electrolyte membrane obtained by the above-described method may be subjected to a washing process of washing with an acid and/or water at the coating stage prior to the heating treatment.

Washing with an acid is conducted so as to generate an ion exchange capability by removing metal ions or organic matter ions bonded to the ion exchange group in the coated membrane. Therefore, if ion exchange capability can be obtained without washing with the acid, it is not necessary to wash with the acid, and thus this process is carried out as necessary.

Examples of the acid used for washing with acid include a single acid of inorganic acids such as hydrochloric acid, sulfuric acid, nitric acid, phosphoric acid, hydrogen peroxide, phosphonic acid and phosphinic acid; a single acid of organic acids such as tartaric acid, oxalic acid, acetic acid, formic acid, trifluoroacetic acid, aspartic acid, aminobenzoic acid, aminoethylphosphonic acid, inosine, glycerinphosphoric acid, diaminobutyric acid, dichloroacetic acid, cysteine, dimethylcysteine, nitroaniline, nitroacetic acid, picric acid, picolinic acid, histidine, bipyridine, pyrazine, proline, maleic acid, methanesulfonic acid, trifluoromethanesulfonic acid, toluenesulfonic acid and trichloroacetic acid; or solutions prepared by dissolving these inorganic acids and/or organic acids in water, methyl ethyl ketone, acetonitrile, propylene carbonate, nitromethane, dimethylsulfoxide, N,N-dimethylformamide, N-methyl-2-pyrrolidone, pyridine, methanol, ethanol and acetone.

It is preferred that the pH at 25° C. of these acids is 2 or less. Further, the washing temperature can have from 0 to 160° C. If the washing temperature is too low, the reaction time becomes long. If the temperature is too high, the polyazole-based compound may decompose, or the chemical bond between the perfluorocarbon sulfonic acid resin and the functional group of the polyazole-based compound may be lost, whereby the durability enhanced by the chemical bond may disappear. Therefore, the treatment temperature is preferably from 5 to 140° C. In the case of acid washing at high temperature, it is preferable to use an acid-resistant autoclave.

Washing with water may also be carried out as necessary. Especially in the case of washing with an acid, washing with water is conducted in order to remove acid remaining in the membrane. Even when washing with an acid is not conducted, washing with water can be conducted for the purpose of removing impurities in the membrane.

In addition to water, the solvent used for washing may also be an organic solvent having a pH of from 1 to 7. When water is used for washing, it is preferable to use a sufficient amount of pure water having a conductivity of 0.06 S/cm or less. The washing is preferably conducted until the pH of the wash water is from 6 to 7.

When the cross section of the thus-obtained polymer electrolyte membrane is observed using a transmission or scanning electron microscope, particles of the polyazole-based compound can be observed in the perfluorocarbon sulfonic acid resin. The particles can be observed to be uniformly dispersed having an average particle size of 1 μm or less. A film in which the particles have a large average particle size of 2 μm or more and are not uniformly dispersed has insufficient mechanical strength and generates microvoids formed during power generation, thereby causing cross leakage of hydrogen gas or the like.

The polymer electrolyte membrane can also have the above coated membrane to be drawn under the proper conditions, whereby the dimensional change when moistened can be reduced by drawing.

Examples of a method for fabricating an MEA from the thus-obtained polymer electrolyte membrane and the highly durable electrode catalyst layer according to the present invention include the following methods.

Highly durable electrode catalyst layers according to the present invention formed on a substrate made of the above-described PTFE or the like are placed to face each other, and a polymer electrolyte membrane is sandwiched therebetween. These layers are transferred onto and joined to each other by hot pressing at 100 to 200° C. The substrates are then removed, to thereby obtain an MEA. Such method for fabricating an MEA is well known to a person skilled in the art. For example, the fabrication method of MEA is described in detail in "Journal of Applied Electrochemistry", 22 (1992), pp. 1-7.

In addition, an MEA can also be obtained by joining highly durable electrode catalyst layers of the present invention, which is obtained by coating or dipping the electrolytic polymer solution onto a gas diffusion electrode, such as ELAT™, manufactured by De Nora North America, U.S.A., where a gas diffusion layer and an electrode catalyst layer are layered together, and then drying and solidifying the electrode, to the above-described polymer electrolyte membrane.

(Solid Polymer Fuel Cell)

Basically, an operable solid polymer fuel cell can be obtained by connecting the anode and cathode of the above-described MEA to each other through an electron conductive material which is positioned on the outside of the polymer electrolyte layered membrane. When fabricating this device, the gas diffusion layers on the each outer surface of the anode catalyst layer and the cathode catalyst layer can be set as necessary. As a gas diffusion layer, commercially available carbon cloth or carbon paper can be used. Representative examples of carbon cloth include carbon cloth E-tek,B-1 manufactured by De Nora North America, U.S.A. Representative examples of carbon paper include Carbel™ (manufactured by Japan Gore-Tex Inc., Japan), TGP-H manufactured by Toray Industries, Inc., Japan and carbon paper 2050 manufactured by Spectracorp, U.S.A. Methods for fabricating a solid polymer fuel cell are well known to a person skilled in the art. For example, methods are described in detail in "Fuel Cell Handbook" (Van Nostrand Reinhold, A. J. Appleby et al, ISBN: 0-442-31926-6); and "Kagaku One Point, Nenryo Denchi", 2nd edition, edited by Masao Taniguchi and Manabu Seno, published by Kyoritsu Shuppan Co., Ltd., Japan, 1992.

Examples of electron conductive materials include current collectors of plates of graphite, a composite material comprising graphite and resin, or a metal. In this case, channels for flowing a gaseous fuel or oxidant and the like are formed on the surface of the electron conductive materials. When the MEA has no gas diffusion layer, a solid electrolyte fuel cell can be obtained by being incorporated into a casing for a single cell (e.g., PEFC single cell, manufactured by Electro-Chem. Inc., U.S.A.) so that the a gas diffusion layer is are positioned on each of the outer surfaces of the MEA anode and cathode.

To obtain high voltage, a plurality of such single cells may be stacked to work a fuel cell in the form of a stack cell. To produce such a fuel cell in the form of a stack cell, a plurality of MEAs are fabricated and incorporated into a casing for a stack cell (e.g., PEFC stack cell, manufactured by Electro-Chem. Inc., U.S.A.). In such a fuel cell in the form of a stack cell, a current collector called a "bipolar plate" is used which serves both functions as a separator to separate fuel from the oxidant supplied to an adjacent cell and as an electric connector connecting adjacent cells.

A fuel cell is operated by supplying hydrogen to one electrode of the cell and supplying oxygen or air to the other electrode of the cell. From the viewpoint of increasing the catalytic activity of the electrodes, the fuel cell is preferably operated at a temperature as high as possible. In general, the fuel cell is operated at 50 to 80° C. where the control of moisture is easy. However, the fuel cell can also be operated at 80 to 150° C.

EXAMPLES

The present invention will be specifically described below with reference to the following examples and comparative examples. The present invention is, however, not limited to these examples and comparative examples.

The evaluation methods and measurement methods used in the examples and comparative examples were as follows.
(Fuel Cell Evaluation)

To determine the battery properties (hereinafter, "initial properties") during the initial stage of the below-produced electrode catalyst layer and membrane electrode assembly, the following fuel cell evaluation was performed.

First, an anode gas diffusion layer and a cathode gas diffusion layer were placed to face each other, and the below-fabricated MEA was sandwiched therebetween, and this structure was incorporated into an evaluation cell. As the gas diffusion layers, carbon cloths (E-tek,B-1™, manufactured by De Nora North America, U.S.A) were set and incorporated into the evaluation cell. This evaluation cell was placed onto an evaluation apparatus (manufactured by Chino Corporation, Japan), and the temperature was raised to 80° C. Hydrogen gas was flowed to the anode at 300 cc/min, and air was flowed to the cathode at 800 cc/min. Both the anode and cathode were pressurized at 0.15 MPa (absolute pressure). Using a water-bubbling system for gas humidification, the hydrogen and air were supplied to the fuel cell by humidifying the hydrogen gas at 85° C. and the air at 75° C. The current/voltage curve was measured for determining the initial properties.

(Accelerated Durability Evaluation)

After determining the initial properties as described above, durability was evaluated in an accelerated manner under the following high temperature/low humidity conditions.

First, the cell temperature was set to 100° C., and both the anode and cathode sides were set to a gas humidification of 60° C. saturated water vapor pressure and no applied pressure (atmospheric pressure). Further, the hydrogen gas supplied to the anode side and the air supplied to the cathode side were flowed at 100 cc/min, to maintain the OCV state. The acronym "OCV" used here means "open circuit voltage".

To determine whether or not a pinhole had occurred in the polymer electrolyte membrane, the hydrogen gas permeability was measured every 10 hours from the start of the test with the flow type gas permeability analyzer "GTR-100FA", manufactured by GTR TEC Corp., Japan. While maintaining the anode side in the evaluation cell at 0.15 MPa with the hydrogen gas, argon as a carrier gas was flowed to the cathode side at 10 cc/min. Hydrogen gas which permeated from the anode side to the cathode side in the evaluation cell by cross leakage was placed into a gas chromatograph G2800 together with the carrier gas, to thereby determine the amount of hydrogen permeation. The hydrogen permeability (L) (cc·cm$^{-1}$·sec$^{-1}$·Pa$^{-1}$) was calculated using the following formula, wherein X (cc) represents the amount of hydrogen permeation, B represents the correction coefficient (=1.100), T (cm) represents the thickness of the polymer electrolyte membrane, P (Pa) represents the hydrogen partial pressure, A (cm$^2$) represents the hydrogen permeation area of the polymer electrolyte membrane, and D (sec) represents the measurement time:

$$L=(X \times B \times T)/(P \times A \times D)$$

The test was stopped when the hydrogen permeability became 10 times that prior to the OCV test.

Further, after the test had been stopped, the battery discharge water from both the anode side and the cathode side was collected, and was subjected to the following fluorine ion concentration measurement.

(Fluorine Ion Concentration Measurement)

The fluorine ion concentration in the discharge water discharged during the above-described accelerated durability evaluation was measured using a fluorine composite electrode (model: 9609B Nionplus™) and ion meter (model: 920A Plus™) manufactured by Thermo Orion. First, the fluorine ion concentration of standard solutions having a 0.1 ppm, 1 ppm and 10 ppm fluorine ion concentration was respectively measured to produce a calibration curve. Next, 4 ml of battery discharge water was collected, and this was added with 0.40 ml of an ion strength adjuster. The fluorine composite electrode was then dipped into this solution. And, after the stabilization, the fluorine ion concentration was measured.

Example 1

The example will be illustrated below. In this case, a highly durable electrode catalyst layer was used which was composed of perfluorocarbon sulfonic acid resin (hereinafter, "PFSA") represented by $[CF_2CF_2]_{0.812}$—$[CF_2$—$CF$(—O—$(CF_2)_2$—$SO_3H)]_{0.188}$, poly[2,2'-(m-phenylene)-5,5'-bibenzimidazole] (hereinafter, "PBI") sodium salt (hereinafter, "PBI-Na") as a polyazole-based compound, and a platinum catalyst-loaded carbon as a composite particle, wherein the composite particle/PFSA/PBI-Na weight ratio was 70.2/29.5/0.3.

First, the methods for producing the PFSA and dissolving the PFSA in a protic solvent will be described.

A perfluorocarbon polymer (MI: 3.0) consisting of tetrafluoroethylene and $CF_2$=$CFO(CF_2)_2$—$SO_2F$ was synthesized as a precursor polymer for the PFSA. Then, using an extruder, the synthesized polymer was extruded from a round mouthpiece at 270° C., and cooled with room temperature water. The polymer was then cut into cylindrical pellets of 2 to 3 mm in diameter and 4 to 5 mm in length. The pellet-shaped precursor polymer was dipped for 6 hours at 95° C. into an aqueous solution containing potassium hydroxide (15% by weight) and dimethylsulfoxide (30% by weight) dissolved therein to carry out a hydrolysis treatment. The polymer was then dipped for 4 hours in water having a temperature of 60° C. Next, the polymer was dipped for 6 hours in an aqueous 2N hydrochloric acid solution (manufactured by Wako Pure Chemical Industries, Ltd.) having a temperature of 60° C., and then washed with ion exchanged water and dried, to thereby obtain PFSA having an ion exchange capacity of 1.41 milliequivalents/g.

Next, the thus-treated PFSA was charged into an autoclave such that the solid component concentration was 5% by weight, ethanol was 47.5% by weight and water was 47.5% by weight. This mixture was treated under stirring for 4 hours at 180° C., to thereby obtain a uniform perfluorocarbon sulfonic acid resin solution. This solution is referred to as perfluorocarbon sulfonic acid resin solution (AS1).

100 g of pure water was added to 100 g of this perfluorocarbon sulfonic acid resin solution AS1, and the resulting solution was stirred. The solution was then concentrated by heating at 80° C. while stirring until the solid component concentration was 10% by weight. This concentrated perfluorocarbon sulfonic acid resin solution is referred to as perfluorocarbon sulfonic acid resin solution AS2 (PFSA/water=10/90 (weight ratio)).

In addition, 400 g of ethanol was added to 100 g of the perfluorocarbon sulfonic acid resin solution AS1. The resulting solution is referred to as AS3 (PFSA/water/ethanol=1/8/91 (weight ratio)).

Next, PBI and an alkali metal hydroxide were dissolved in the following manner in a protic solvent. Specifically, 0.1 g of PBI (manufactured by Sigma-Aldrich Japan K.K., having a weight average molecular weight of 27,000) was dipped into a mixed solution consisting of 1 g of aqueous NaOH of 10% by weight and 2.0 g of ethanol, and the resultant solution was stirred for 1 hour while heating at 80° C. Once the PBI had dissolved in the solvent, 6.9 g of ethanol was added, to thereby obtain a red-brown polybenzimidazole solution, which is referred to as polyazole resin solution (BS1).

60 g of the above-described perfluorocarbon sulfonic acid resin solution (AS3) was added to 10 g of this polyazole resin solution (BS1), to thereby obtain a transparent solution having a weak red-brown color. 84 g of the above-described perfluorocarbon sulfonic acid resin solution (AS2) was added to this solution with stirring. The resulting yellow transparent solution is referred to as electrolytic polymer solution A. The composition of the electrolytic polymer solution A was PFSA/PBI/NaOH/water/ethanol=55.88/0.06/0.06/52.80/41.20 (weight ratio).

Using the thus-obtained electrolytic polymer solution A, a highly durable electrode catalyst layer was produced in the following manner.

7.33 g of the above-obtained electrolytic polymer solution A was added to 1.00 g of platinum-loaded carbon ("TEC10E40E", manufactured by Tanaka Kikinzoku Kogyo K.K.; 36.4% by weight of platinum). The resultant solution was then thoroughly mixed by a homogenizer to obtain an electrode catalyst composition. This electrode catalyst composition was coated onto a PTFE sheet by a screen printing process. After coating, the PTFE sheet was dried, first at room temperature for 1 hour, and then at 160° C. in air for 1 hour, to thereby obtain a highly durable electrode catalyst layer having a thickness of about 10 μm. Among the highly durable electrode catalyst layers, the layer having a platinum load of 0.15 mg/cm$^2$ was used for the anode catalyst layer, and the layer having a platinum load of 0.30 mg/cm$^2$ was used for the cathode catalyst layer.

Further, using the above-obtained electrolytic polymer solution A, a highly durable polymer electrolyte membrane was produced in the following manner.

37.3 g of the above-described electrolytic polymer solution A was evenly spread over a 20 cm wide and 20 cm long petri dish made from SUS 316, and then dried over a hotplate for 2 hours at 80° C. The resultant membrane was then further heat treated for 1 hour at 180° C. in a hot-air oven. After cooling, the membrane was peeled off from the dish, and then dipped for 8 hours in an aqueous 2N hydrochloric acid solution (manufactured by Wako Pure Chemical Industries, Ltd.) having a temperature of 25° C. The membrane was washed with acid, and then thoroughly washed with ion exchanged water. The membrane was subsequently dried under a 25° C., 35% RH environment, to thereby obtain a transparent, 50 μm thick highly durable polymer electrolyte membrane exhibiting a uniformly weak brown color.

The above-described anode catalyst layer and cathode catalyst layer were placed to face each other, and the thus-obtained highly durable polymer electrolyte membrane was sandwiched therebetween. The anode catalyst layer and cathode catalyst layer were transferred onto and joined to the polymer electrolyte membrane by hotpressing at 180° C. at a pressure of 0.1 MPa, to thereby fabricate an MEA.

Using this MEA, a fuel cell evaluation and an accelerated durability evaluation were carried out. The current density at a voltage of 0.6 V was 1.00 A/cm$^2$, showing that initial properties were good. In the accelerated durability evaluation, a durability of 300 hours or more was exhibited. The fluorine ion concentration in the anode side fuel cell discharge water and the cathode side fuel cell discharge water discharged up to 300 hours were respectively 0.5 ppm and 0.4 ppm, which were both very low values. As a result, it was learned that both of the highly durable electrode catalyst layer and highly durable MEA according to the present invention had excellent chemical stability, and that good initial properties and high durability could be obtained.

Example 2

A membrane electrode assembly will be described below, which was fabricated using the same anode catalyst layer and cathode catalyst layer as produced in Example 1, and the following polymer electrolyte membrane.

37.3 g of the above-described perfluorocarbon sulfonic acid resin solution (AS1) was evenly spread over a 20 cm wide and 20 cm long petri dish made from SUS 316, and then dried over a hotplate for 2 hours at 80° C. The resultant membrane was then further heat treated for 1 hour at 180° C. in a hot-air oven. After cooling, the membrane was peeled off from the dish, and then dipped for 8 hours in an aqueous 2N hydrochloric acid solution (manufactured by Wako Pure Chemical Industries, Ltd.) having a temperature of 25° C. The membrane was washed with acid, and then thoroughly washed with ion exchanged water. The membrane was subsequently dried under a 25° C., 35% RH environment, to thereby obtain a transparent, 50 μm thick polymer electrolyte membrane.

Using this polymer electrolyte membrane, and the same anode catalyst layer and cathode catalyst layer as produced in Example 1, an MEA was fabricated in the same manner as in Example 1.

Using this MEA, a fuel cell evaluation and an accelerated durability evaluation were carried out. The current density at a voltage of 0.6 V was 1.00 A/cm$^2$, showing that initial properties were good. In the accelerated durability evaluation, the hydrogen gas permeation rate suddenly increased at 150 hours, and the test was stopped. The fluorine ion concentration in the anode side fuel cell discharge water and the cathode side fuel cell discharge water discharged up to the point when the test was stopped were respectively 1 ppm and 2 ppm, which were both low values. From these results, it was learned that the highly durable electrode catalyst layer according to the present invention had excellent chemical stability, and that durability could be improved while maintaining good initial properties.

Example 3

An example will be described below. In this case, a highly durable electrode catalyst layer was used which was composed of the same PFSA, PBI-Na, and a composite particles as in Example 1, wherein the composite particle/PFSA/PBI-Na weight ratio was 68.2/29.2/2.6. This highly durable electrode catalyst layer was produced using the following electrolytic polymer solution B.

First, an alkali metal hydroxide and PBI were dissolved in the following manner in a protic solvent. Specifically, 0.0324 g of PBI (manufactured by Sigma-Aldrich Japan K.K., having a weight average molecular weight of 27,000) was dipped into a mixed solution consisting of 0.1394 g of aqueous NaOH of 16% by weight and 10 g of ethanol, and the resultant solution was stirred for 1 hour while heating at 80° C. Once the PBI had dissolved in the solvent, 5.3487 g of ethanol was added, to thereby obtain a red-brown polybenzimidazole solution. This solution is referred to as polyazole resin solution (BS2).

12.312 g of the above-described perfluorocarbon sulfonic acid resin solution AS1 was added to 15.5205 g of this polyazole resin solution (BS2). The resultant solution was mixed, and a yellow transparent solution was obtained. This solution is referred to as electrolytic polymer solution B. The composition of the electrolytic polymer solution B was PFSA/PBI/NaOH/water/ethanol=2.23/0.12/0.08/21.61/75.96 (weight ratio).

Using the thus-obtained electrolytic polymer solution B, a highly durable electrode catalyst layer was produced in the following manner.

9.60 g of the above-described electrolytic polymer solution B was added to 0.5 g of platinum-loaded carbon ("TEC10E40E", manufactured by Tanaka Kikinzoku Kogyo K.K.; 36.4% by weight of platinum). The resultant solution was then thoroughly mixed by a homogenizer to obtain an electrode catalyst composition. This electrode catalyst composition was coated onto a PTFE sheet by a screen printing method. After coating, the PTFE sheet was dried, first at room temperature for 1 hour, and then at 160° C. in air for 1 hour, to thereby obtain a highly durable electrode catalyst layer having a thickness of about 10 μm. Within the highly durable electrode catalyst layer, the portion having a platinum load of 0.15 mg/cm² was used for the anode catalyst layer, and the portion having a platinum load of 0.30 mg/cm² was used for the cathode catalyst layer.

Further, using the above-described electrolytic polymer solution B, a highly durable polymer electrolyte membrane was produced in the following manner.

92.1 g of the above-described electrolytic polymer solution B was evenly spread over a 20 cm wide and 20 cm long petri dish made from SUS 316, and then dried over a hotplate for 2 hours at 80° C. The resultant membrane was then further heat treated for 1 hour at 180° C. in a hot-air oven. After cooling, the membrane was peeled off from the dish, and then dipped for 8 hours in an aqueous 2N hydrochloric acid solution (manufactured by Wako Pure Chemical Industries, Ltd.) having a temperature of 25° C. The membrane was washed with acid, and then thoroughly washed with ion exchanged water. The membrane was subsequently dried under a 25° C., 35% RH environment, to thereby obtain a transparent and 50 μm thick highly durable polymer electrolyte membrane exhibiting a uniformly weak brown color.

Using the thus-obtained highly durable polymer electrolyte membrane and the above-described anode catalyst layer and cathode catalyst layer, an MEA was fabricated in the same manner as in Example 1.

Using this MEA, a fuel cell evaluation and an accelerated durability evaluation were carried out. The current density at a voltage of 0.6 V was 0.9 A/cm², showing that initial properties were slightly lower than those for Example 1. In the accelerated durability evaluation, a durability of 300 hours or more was exhibited. The fluorine ion concentration in the anode side fuel cell discharge water and the cathode side fuel cell discharge water discharged up to 300 hours were respectively 0.05 ppm and 0.04 ppm, which were both extremely low values. From these results, it was learned that both of the highly durable electrode catalyst layer and highly durable MEA according to the present invention had excellent chemical stability, and that good initial properties and high durability could be obtained.

Example 4

An MEA was fabricated in the same manner as in Example 3 using the same highly durable electrode catalyst layer as in Example 3, and the same polymer electrolyte membrane as in Example 2.

Using this MEA, a fuel cell evaluation and an accelerated durability evaluation were carried out. The current density at a voltage of 0.6 V was 1.00 A/cm², showing that initial properties were good. In the accelerated durability evaluation, a durability of 300 hours or more was exhibited. The fluorine ion concentration in the anode side fuel cell discharge water and the cathode side fuel cell discharge water discharged up to 300 hours were both 0.6 ppm, which was a very low value. From these results, it was learned that both of the highly durable electrode catalyst layer and highly durable MEA according to the present invention had excellent chemical stability, and that good initial properties and high durability could be obtained.

Example 5

A highly durable electrode catalyst layer composed of the same PFSA and composite particle as used in Example 1 and the following PBI powder, wherein the composite particle/PFSA/PBI weight ratio was 64.5/27.6/7.9, and a membrane electrode assembly fabricated using the same polymer electrolyte membrane as in Example 2, will be described below.

The PBI powder was produced by spray drying the polyazole resin solution BS3 in the following manner.

First, the same PBI as used in Example 1 and dimethylacetamide (hereinafter "DMAC") were put into an autoclave, which was then sealed. The temperature was increased to 200° C., and the mixture was held therein for 5 hours. The autoclave was naturally cooled, and a PBI solution was obtained having a composition of PBI/DMAC=10/90 (weight ratio). The solid viscosity of this PBI solution was 0.8 (dl/g). This PBI solution was diluted by a factor of two with DMAC, to thereby produce a polyazole resin solution (BS3) having a composition consisting of PBI/DMAC=5/95 (weight ratio).

100 g of this polyazole resin solution (BS3) was sprayed using a spray drier for organic solvents ("GS310", manufactured by Yamato Scientific Co., Ltd.), to thereby obtain 7 g of a PBI powder. The operating conditions at this stage were an inlet temperature of 155° C., an outlet temperature of 100° C., a solution feed rate of 2.5 g/min, and a spray pressure of 0.10 MPa.

The particle size distribution of the thus-obtained powder as measured by a wet-method (using "SALD-2200" manufactured by Shimadzu Corporation) had an average particle size (50% volume base) of 5.7 μm.

3.55 g of the above-described PBI powder was added to 100 g of the perfluorocarbon sulfonic acid resin solution AS1 produced in Example 1. The resultant solution was mixed to obtain an electrolytic polymer solution C. 0.7 g of the same platinum-loaded carbon as in Example 1 was added to 2.5 g of the electrolytic polymer solution C. The resultant solution was then thoroughly mixed by a homogenizer to obtain an electrode catalyst composition. This electrode catalyst composition was coated onto a PTFE sheet by a screen printing method. After coating, the PTFE sheet was dried, first at room temperature for 1 hour, and then at 160° C. in air for 1 hour, to thereby obtain an electrode catalyst layer having a thickness of about 10 μm. In the electrode catalyst layer obtained in such a way, the portion having a platinum load of 0.15 mg/cm² was used for the anode catalyst layer, and the portion having a platinum load of 0.30 mg/cm² was used for the cathode catalyst layer.

Using the same polymer electrolyte membrane as in Example 2 and the above-described anode catalyst layer and cathode catalyst layer, an MEA was fabricated in the same manner as in Example 1.

Using this MEA, a fuel cell evaluation and an accelerated durability evaluation were carried out. The current density at a voltage of 0.6 V was 1.00 A/cm², showing that initial properties were good. In the accelerated durability evaluation, a durability of 300 hours or more was exhibited. The fluorine ion concentration in the anode side fuel cell discharge water and the cathode side fuel cell discharge water discharged up to 300 hours were both 1 ppm, which was a low value. From these results, it was learned that the highly durable electrode catalyst layer according to the present invention had excellent chemical stability, and that good initial properties and high durability could be obtained.

Example 6

A membrane electrode assembly will be described below, which was fabricated using the highly durable electrode catalyst layer produced in Example 5 and the following highly durable polymer electrolyte membrane.

37.3 g of the same electrolytic polymer solution C as produced in Example 5 was evenly spread over a 20 cm wide and 20 cm long petri dish made from SUS 316, and then dried over a hotplate for 2 hours at 80° C. The resultant membrane was then further heat treated for 1 hour at 180° C. in a hot-air oven. After cooling, the membrane was peeled off from the dish, and then dipped for 8 hours in an aqueous 2N hydrochloric acid solution (manufactured by Wako Pure Chemical Industries, Ltd.) having a temperature of 25° C. The membrane was washed with acid, and then thoroughly washed with ion exchanged water. The membrane was subsequently dried under a 25° C., 35% RH environment, to thereby obtain a 50 µm thick highly durable polymer electrolyte membrane.

Using this polymer electrolyte membrane and the same anode catalyst layer and cathode catalyst layer as produced in Example 5, an MEA was fabricated in the same manner as in Example 1.

Using this MEA, a fuel cell evaluation and an accelerated durability evaluation were carried out. The current density at a voltage of 0.6 V was 0.8 A/cm$^2$, showing that initial properties were lower than those for Example 1. In the accelerated durability evaluation, a durability of 300 hours or more was exhibited. The fluorine ion concentration in the anode side fuel cell discharge water and the cathode side fuel cell discharge water discharged up to 300 hours were respectively 0.5 ppm and 0.4 ppm, which were both very low values. From these results, it was learned that the highly durable electrode catalyst layer and highly durable MEA according to the present invention both had excellent chemical stability, and that good initial properties and high durability could be obtained.

Example 7

A highly durable electrode catalyst layer composed of the same PFSA and composite particle as used in Example 1 and the same PBI powder as produced in Example 5, wherein the composite particle/PFSA/PBI weight ratio was 54/23/23, and a membrane electrode assembly fabricated using the same highly durable polymer electrolyte membrane as produced in Example 1, will be described below.

8.56 g of the above-described perfluorocarbon sulfonic acid resin solution (AS1) and 0.428 g of PBI powder was added to 1.00 g of the same platinum-loaded carbon used in Example 1. The resultant solution was then thoroughly mixed by a homogenizer to obtain an electrode catalyst composition. This electrode catalyst composition was coated onto a PTFE sheet by a screen printing method. After coating, the PTFE sheet was dried, first at room temperature for 1 hour, and then at 160° C. in air for 1 hour, to thereby obtain a highly durable electrode catalyst layer having a thickness of about 10 µm. In the highly durable electrode catalyst layer obtained in such a way, the portion having a platinum load of 0.15 mg/cm$^2$ was used for the anode catalyst layer, and the portion having a platinum load of 0.30 mg/cm$^2$ was used for the cathode catalyst layer.

Using the same highly durable polymer electrolyte membrane as produced in Example 1, and the above-described anode catalyst layer and cathode catalyst layer, an MEA was fabricated in the same manner as in Example 1.

Using this MEA, a fuel cell evaluation and an accelerated durability evaluation were carried out. The current density at a voltage of 0.6 V was 1.0 A/cm$^2$, showing that initial properties were good. In the accelerated durability evaluation, a durability of 300 hours or more was exhibited. The fluorine ion concentration in the anode side fuel cell discharge water and the cathode side fuel cell discharge water discharged up to 300 hours were respectively 0.02 ppm and 0.03 ppm, which were both extremely low values. From these results, it was learned that both of the highly durable electrode catalyst layer and highly durable MEA according to the present invention had excellent chemical stability, and that good initial properties and high durability could be obtained.

Example 8

A highly durable electrode catalyst layer composed of the same PFSA and composite particles as in Example 1 and the following PBI-Na powder, wherein the composite particle/PFSA/PBI-Na weight ratio was 53.8/23.2/23.0, and a membrane electrode assembly fabricated using the same highly durable polymer electrolyte membrane as produced in Example 2, will be described below.

The PBI-Na powder was produced by preparing 100 g of the same polyazole resin solution (BS1) as produced in Example 1, and then spray drying in the same manner as in Example 5. The average particle size was 7.3 µm.

Next, 8.56 g of the above-described perfluorocarbon sulfonic acid resin solution (AS1) and 0.428 g of PBI-Na powder was added to 1.00 g of the same platinum-loaded carbon used in Example 1. The resultant solution was then thoroughly mixed by a homogenizer to obtain an electrode catalyst composition. This electrode catalyst composition was coated onto a PTFE sheet by a screen printing method. After coating, the PTFE sheet was first dried at room temperature for 1 hour and then at 160° C. in air for 1 hour, to thereby obtain a highly durable electrode catalyst layer having a thickness of about 10 µm. In the highly durable electrode catalyst layer obtained in such a way, the portion having a platinum load of 0.15 mg/cm$^2$ was used for the anode catalyst layer, and the portion having a platinum load of 0.30 mg/cm$^2$ was used for the cathode catalyst layer.

Using the same highly durable polymer electrolyte membrane as in Example 1 and the above-described anode catalyst layer and cathode catalyst layer, an MEA was fabricated in the same manner as in Example 1.

Using this MEA, a fuel cell evaluation and an accelerated durability evaluation were carried out. The current density at a voltage of 0.6 V was 1.0 A/cm$^2$, showing that initial properties were good. In the accelerated durability evaluation, a durability of 300 hours or more was exhibited. The fluorine ion concentration in the anode side fuel cell discharge water and the cathode side fuel cell discharge water discharged up to 300 hours were respectively 0.3 ppm and 0.2 ppm, which were both very low values. From these results, it was learned that the highly durable electrode catalyst layer according to the present invention had excellent chemical stability, and that good initial properties and high durability could be obtained.

Example 9

A highly durable electrode catalyst layer composed of the same PFSA and composite particles as in Example 1 and the following PBI-PFSA powder wherein the composite particle/PFSA/PBI-PFSA weight ratio was 53.8/34.7/11.5, and a membrane electrode assembly fabricated using the same polymer electrolyte membrane as produced in Example 2 will be described below.

The PBI-PFSA powder was produced by preparing 100 g of the following electrolytic polymer solution D, and then spray drying in the same manner as in Example 5. The average particle size was 6.1 µm.

The electrolytic polymer solution D was produced by mixing 77 g of a perfluorocarbon sulfonic acid resin solution (AS4) which consists of PFSA/DMAC=1.5/98.5 (weight ratio) and 23 g of the same polyazole resin solution (BS3) as produced in Example 5 which consists of PBI/DMAC=5/95 (weight ratio).

The perfluorocarbon sulfonic acid resin solution AS4 was produced by adding dimethylacetamide (hereinafter "DMAC") to the perfluorocarbon sulfonic acid resin solution AS1 produced in Example 1, refluxing the resulting solution for 1 hour at 120° C., and then concentrating it under reduced pressure with an evaporator.

Next, 8.56 g of the above-described perfluorocarbon sulfonic acid resin solution (AS1) and 0.428 g of the PBI-PFSA powder was added to 1.00 g of the same platinum-loaded carbon used in Example 1. The resultant solution was then thoroughly mixed by a homogenizer to obtain an electrode catalyst composition. This electrode catalyst composition was coated onto a PTFE sheet by a screen printing method. After coating, the PTFE sheet was first dried at room temperature for 1 hour, and then at 160° C. in air for 1 hour, to thereby obtain a highly durable electrode catalyst layer having a thickness of about 10 µm. In the highly durable electrode catalyst layer obtained in such a way, the portion having a platinum load of 0.15 mg/cm$^2$ was used for the anode catalyst layer, and the portion having a platinum load of 0.30 mg/cm$^2$ was used for the cathode catalyst layer.

Using the same polymer electrolyte membrane as produced in Example 2, and the above-described anode catalyst layer and cathode catalyst layer, an MEA was fabricated in the same manner as in Example 1.

Using this MEA, a fuel cell evaluation and an accelerated durability evaluation were carried out. The current density at a voltage of 0.6 V was 1.0 A/cm$^2$, showing that initial properties were good. In the accelerated durability evaluation, a durability of 300 hours or more was exhibited. The fluorine ion concentration in the anode side fuel cell discharge water and the cathode side fuel cell discharge water discharged up to 300 hours were both 0.6 ppm, which was a vary low value. From these results, it was learned that the highly durable electrode catalyst layer according to the present invention had excellent chemical stability, and that good initial properties and high durability could be obtained.

Example 10

A highly durable electrode catalyst layer composed of the same PFSA and composite particle as in Example 1 and the following PBI-Na-PFSA powder wherein the composite particle/PFSA/PBI-Na weight ratio was 53.8/45.0/1.2, and a membrane electrode assembly fabricated using the same highly durable polymer electrolyte membrane as produced in Example 2, will be described below.

The PBI-Na-PFSA powder was produced by preparing 100 g of the same electrolytic polymer solution B as produced in Example 3, and then spray drying in the same manner as in Example 5. The average particle size was 6.5 µm.

Next, 8.56 g of the above-described perfluorocarbon sulfonic acid resin solution AS1 and 0.428 g of PBI-Na-PFSA powder was added to 1.00 g of the same platinum-loaded carbon used in Example 1. The resultant solution was then thoroughly mixed by a homogenizer to obtain an electrode catalyst composition. This electrode catalyst composition was coated onto a PTFE sheet by a screen printing method. After coating, the PTFE sheet was first dried at room temperature for 1 hour, and then at 160° C. in air for 1 hour, to thereby obtain a highly durable electrode catalyst layer having a thickness of about 10 µm. In the highly durable electrode catalyst layer obtained in such a way, the portion having a platinum load of 0.15 mg/cm$^2$ was used for the anode catalyst layer, and the portion having a platinum load of 0.30 mg/cm$^2$ was used for the cathode catalyst layer.

Using the same highly durable polymer electrolyte membrane as produced in Example 1 and the above-described anode catalyst layer and cathode catalyst layer, an MEA was fabricated in the same manner as in Example 1.

Using this MEA, a fuel cell evaluation and an accelerated durability evaluation were carried out. The current density at a voltage of 0.6 V was 1.0 A/cm$^2$, showing that initial properties were good. In the accelerated durability evaluation, a durability of 300 hours or more was exhibited. The fluorine ion concentration in the anode side fuel cell discharge water and the cathode side fuel cell discharge water discharged up to 300 hours were both 0.8 ppm, which was a very low value. From these results, it was learned that the highly durable electrode catalyst layer according to the present invention had excellent chemical stability, and that good initial properties and high durability could be obtained.

Example 11

1 g of the same PBI used in Example 1 was added to 100 ml of 98% by weight of sulfuric acid (guaranteed reagent, manufactured by Wako Pure Chemical Industries, Ltd.), and the resultant solution was heated for 8 hours at 100° C. The solution was poured into excess ion exchanged water (conductivity of no greater than 0.06 S/cm), and the formed precipitates were collected. This precipitates were repeatedly washed with ion exchanged water (conductivity of no greater than 0.06 S/cm). The formed product was dried at room temperature to obtain sulfonated PBI. The ion exchange capacity of this sulfonated PBI was measured to be 1.50 milliequivalents/g.

Next, a polyazole resin solution was obtained in the same manner as Example 1, except for using this sulfonated PBI. This solution is referred to as polyazole resin solution (BS5).

Then, an electrolytic polymer solution was obtained in the same manner as Example 1 using this polyazole resin solution (BS5) and the perfluorocarbon sulfonic acid resin solutions (AS3 and AS2). This solution is referred to as electrolytic polymer solution F. A highly durable electrode catalyst layer was then produced in the same manner as in Example 1 using this electrolytic polymer solution F.

Using the thus-obtained highly durable electrode catalyst layers (anode catalyst layer and cathode catalyst layer) and the same polymer electrolyte membrane as produced in Example 2, an MEA was fabricated in the same manner as in Example 1.

Using this MEA, a fuel cell evaluation and an accelerated durability evaluation were carried out. The current density at a voltage of 0.6 V was 1.00 A/cm$^2$, showing that initial properties were good. In the accelerated durability evaluation, the hydrogen gas permeation rate rapidly increased at 150 hours, and the test was stopped. The fluorine ion concentration in the anode side fuel cell discharge water and the cathode side fuel cell discharge water discharged up to the point when the test was stopped were both 2 ppm, which were both low values. From these results, it was learned that the highly durable electrode catalyst layer according to the present invention had excellent chemical stability, and that good initial properties and high durability could be obtained.

Example 12

A polyazole resin solution was obtained in the same manner as Example 1, except for using polyparaphenylene benzobisoxazole ("Zylon (R)", manufactured by Toyobo Co., Ltd.). This solution is referred to as polyazole resin solution (BS6).

Then, an electrolytic polymer solution was obtained in the same manner as Example 1 using this polyazole resin solution (BS6) and the perfluorocarbon sulfonic acid resin solutions (AS3 and AS2). This solution is referred to as electrolytic polymer solution G. A highly durable electrode catalyst layer was then produced in the same manner as in Example 1 using this electrolytic polymer solution G.

Using the thus-obtained highly durable electrode catalyst layers (anode catalyst layer and cathode catalyst layer) and the same polymer electrolyte membrane as produced in Example 2, an MEA was fabricated in the same manner as in Example 1.

Using this MEA, a fuel cell evaluation and an accelerated durability evaluation were carried out. The current density at a voltage of 0.6 V was 1.00 A/cm$^2$, showing that initial properties were good. In the accelerated durability evaluation, the hydrogen gas permeation rate remarkably increased at 150 hours, and the test was stopped. The fluorine ion concentration in the anode side fuel cell discharge water and the cathode side fuel cell discharge water discharged up to the point when the test was stopped were respectively 2 ppm and 3 ppm, which were both low values. From these results, it was learned that the highly durable electrode catalyst layer according to the present invention had excellent chemical stability, and that good initial properties and high durability could be obtained.

Comparative Example 1

The example will be described below, in which the same polymer electrolyte membrane as in Example 2 and the following anode catalyst layer and cathode catalyst layer were used.

7.33 g of the above-described perfluorocarbon sulfonic acid resin solution (AS1) was added to 1.00 g of platinum-loaded carbon ("TEC10E40E", manufactured by Tanaka Kikinzoku Kogyo K.K.; 36.4% by weight of platinum). The resultant solution was then thoroughly mixed by a homogenizer to obtain an electrode catalyst composition. This electrode catalyst composition was coated onto a PTFE sheet by a screen printing method. After coating, the PTFE sheet was first dried at room temperature for 1 hour and then at 160° C. in air for 1 hour, to thereby obtain an electrode catalyst layer having a thickness of about 10 μm. In the electrode catalyst layer obtained in such a way, the portion having a platinum load of 0.15 mg/cm$^2$ was used for the anode catalyst layer and the portion having a platinum load of 0.30 mg/cm$^2$ was used for the cathode catalyst layer.

Using the above-described anode catalyst layer and cathode catalyst layer and the same polymer electrolyte membrane as produced in Example 2, an MEA was fabricated in the same manner as in Example 1.

Using this MEA, a fuel cell evaluation and an accelerated durability evaluation were carried out. The current density at a voltage of 0.6 V was 1.0 A/cm$^2$ showing that initial properties were good. In the accelerated durability evaluation, the hydrogen gas permeation rate suddenly increased at 20 hours, and the test was stopped. The fluorine ion concentration in the anode side fuel cell discharge water and the cathode side fuel cell discharge water discharged up to the point when the test was stopped were respectively 50 ppm and 40 ppm, which were both high values. Thus, it was learned that an electrode catalyst layer and MEA fabricated based on conventional techniques did not have sufficient chemical stability or sufficient durability.

Comparative Example 2

A membrane electrode assembly fabricated from the same polymer electrolyte membrane as in Example 2 and an electrode catalyst layer produced using the following electrolytic polymer solution E containing an aprotic solvent will be described below.

First, the same polyazole resin solution (BS3) as produced in Example 5 was diluted by a factor of five with DMAC, to thereby prepare a polyazole resin solution (BS4) having a composition consisting of PBI/DMAC=1/99 (weight ratio).

6.5 g of the polyazole resin solution (BS4) was added to Next, 40.0 g of the above-described perfluorocarbon sulfonic acid resin solution (AS4). The resultant solution was mixed, and then 68.9 g of perfluorocarbon sulfonic acid resin solution (AS2) was added thereto. This solution was then further concentrated under reduced pressure at 80° C. to obtain an electrolytic polymer solution E. The composition of the electrolytic polymer solution E was PFSA/PBI/water/DMAC=6.49/0.06/53.73/39.72 (weight ratio).

Using the thus-obtained electrolytic polymer solution E, a highly durable electrode catalyst layer was produced in the following manner.

7.69 g of the above-described electrolytic polymer solution E was added to 1.00 g of platinum-loaded carbon ("TEC10E40E", manufactured by Tanaka Kikinzoku Kogyo K.K.; 36.4% by weight of platinum). The resultant solution was then thoroughly mixed by a homogenizer to obtain an electrode catalyst composition. This electrode catalyst composition was coated onto a PTFE sheet by a screen printing method. After coating, the PTFE sheet was first dried at room temperature for 1 hour and then at 160° C. in air for 1 hour, to thereby obtain an electrode catalyst layer having a thickness of about 10 μm. The weight ratio of this highly durable electrode catalyst layer was composite particles/PFSA/PBI=66.5/33.2/0.3. In the highly durable electrode catalyst layer obtained in such a way, the portion having a platinum load of 0.15 mg/cm$^2$ was used for the anode catalyst layer and the portion having a platinum load of 0.30 mg/cm$^2$ was used for the cathode catalyst layer.

Using such an anode catalyst layer and cathode catalyst layer and the same polymer electrolyte membrane as produced in Example 2, an MEA was fabricated in the same manner as in Example 1.

Using this MEA, a fuel cell evaluation and an accelerated durability evaluation were carried out. The current density at a voltage of 0.6 V was 0.3 A/cm$^2$, showing that initial properties were not as good as those of the Examples. This is considered to be as a result of the aprotic solvent and/or decomposed matter thereof remaining in the electrode catalyst layer poisoning the platinum catalyst. In the accelerated durability evaluation, the hydrogen gas permeation rate suddenly increased at 150 hours, and the test was stopped. The fluorine ion concentration in the anode side fuel cell discharge water and the cathode side fuel cell discharge water discharged up to the point when the test was stopped were respectively 5 ppm and 4 ppm, which were both low values. From these results, it was learned that while durability was better than in Comparative Example 1, practical utility due to the initial properties was poor.

The above results are shown in Table 1.

TABLE 1

| | Catalyst electrode layer | | | | | | Initial | Accelerated durability evaluation | |
|---|---|---|---|---|---|---|---|---|---|
| | Composite | | | | Membrane | | | Endurance | |
| | particle % | PFSA % | PBI Kinds | % | PBI Kinds | % | properties A/cm² | time hr | F-elution (ppm) Anode/cathode |
| Example 1 | 70.2 | 29.5 | PBI-Na | 0.3 | PBI | 1 | 1.0 | ○ (>300 hr) | ○ (0.5/0.4) |
| Example 2 | 70.2 | 29.5 | PBI-Na | 0.3 | None | — | 1.0 | Δ (150 hr) | Δ (1/2) |
| Example 3 | 68.2 | 29.2 | PBI-Na | 2.6 | PBI | 5 | 0.9 | ○ (>300 hr) | ◎ (0.05/0.04) |
| Example 4 | 68.2 | 29.2 | PBI-Na | 2.6 | None | — | 1.0 | ○ (>300 hr) | ○ (0.6/0.6) |
| Example 5 | 64.5 | 27.6 | PBI powder | 7.9 | None | — | 1.0 | ○ (>300 hr) | Δ (1/1) |
| Example 6 | 64.5 | 27.6 | PBI powder | 7.9 | PBI powder | 28.6 | 0.8 | ○ (>300 hr) | ○ (0.5/0.4) |
| Example 7 | 54 | 23 | PBI powder | 23 | PBI | 1 | 1.0 | ○ (>300 hr) | ◎ (0.02/0.03) |
| Example 8 | 53.8 | 23.2 | PBI-Na powder | 23.0 | None | — | 1.0 | ○ (>300 hr) | ○ (0.3/0.2) |
| Example 9 | 53.8 | 34.7 | PBI-PFSA powder | 11.5 | None | — | 1.0 | ○ (>300 hr) | ○ (0.6/0.6) |
| Example 10 | 53.8 | 45.0 | PBI-Na-PFSA powder | 1.2 | None | — | 1.0 | ○ (>300 hr) | ○ (0.8/0.8) |
| Comparative example 1 | 73.2 | 26.8 | None | — | None | — | 1.0 | X (20 hr) | X (50/40) |
| Comparative example 2 | 66.5 | 33.2 | PBI | 0.3 | None | — | 0.3 | Δ (150 hr) | Δ (5/4) |

INDUSTRIAL APPLICABILITY

The highly durable electrode catalyst layer and highly durable membrane electrode assembly according to the present invention can be utilized as a highly durable fuel cell which has excellent chemical stability, and which has low discharge of fluorine ions even when operated for a long time under high temperature and low humidity conditions (e.g., battery operation temperature of 100° C. and 60° C. saturated water vapor pressure (comparable to a humidity (RH) of 20%)).

The invention claimed is:

1. An electrode catalyst layer comprising a composite particle having an electrode catalyst particle supported on an carbon black, activated carbon, graphite, and various metals, a perfluorocarbon sulfonic acid resin (component A) and a polyazole-based compound (component B), wherein polyazole-based compound is selected from the group consisting of compounds represented by chemical formulae (4), (5) and (6) found below;

Formula (4)

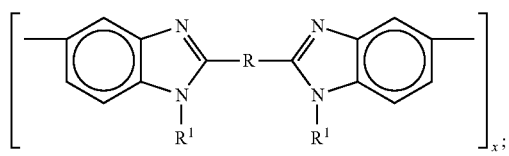

wherein R represents,

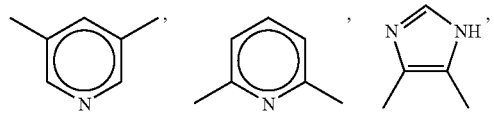

-continued

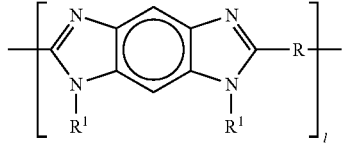

an alkylene chain, a divalent group or a fluoroalkylene chain, each R1 independently represents a hydrogen atom, an alkyl, a phenyl group, or a pyridyl group, and "x" denotes a number from 10 or more to 1.0×107 or less;

Formula (5):

(5)

wherein "1" denotes a number from 10 or more to 1.0×107 or less, and R and R1 are defined in the same manner as in chemical formula (4);

Formula (6):

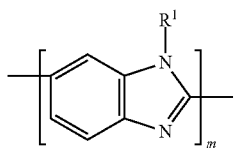

(6)

wherein "m" denotes a number from 10 or more to 1.0×107 or less, and R1 is defined in the same manner as in chemical formula (4);

wherein the content of the composite particle is 20 to 95% by weight, the total weight of component A and component B is 5 to 80% by weight, and the weight ratio (A/B) between component A and component B is 1 to 499.

2. The electrode catalyst layer according to claim 1, wherein the polyazole-based compound is a polyazole salt.

3. The electrode catalyst layer according to claim 1, wherein the polyazole-based compound is a polyazole alkali metal salt.

4. The electrode catalyst layer according to claim 1, wherein the polyazole-based compound is poly[(2,2'-(m-phenylene)-5,5'-bibenzoimidazole] metal salt.

5. The electrode catalyst layer according to claim 1, wherein the polyazole-based compound is a powder having an average particle size of 0.1 to 50 μm.

6. The electrode catalyst layer according to claim 1, which comprises a composite powder consisting of the perfluorocarbon sulfonic acid resin and the polyazole-based compound, wherein the composite powder has an average particle size of 0.1 to 50 μm.

7. The electrode catalyst layer according to claim 2, wherein the polyazole-based compound is a polyazole alkali metal salt.

8. The electrode catalyst layer according to claim 7, wherein the polyazole-based compound is poly[(2,2'-(m-phenylene)-5,5'-bibenzoimidazole] metal salt.

9. The electrode catalyst layer according to claim 8, wherein the polyazole-based compound is a powder having an average particle size of 0.1 to 50 μm.

10. The electrode catalyst layer according to claim 9, which comprises a composite powder consisting of the perfluorocarbon sulfonic acid resin and the polyazole-based compound, wherein the composite powder has an average particle size of 0.1 to 50μm.

11. The electrode catalyst layer according to claim 1, wherein the weight ratio (A/B) between component A and component B is 1 to 199.

12. The electrode catalyst layer according to claim 1, wherein component A is a polymer having repeat units represented by chemical formula (1) found below:

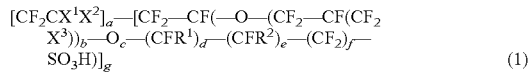

(1)

wherein $X^1$, $X^2$ and $X^3$ each independently represents a halogen or a perfluoroalkyl group having 1 to 3 carbon atoms, $0 \leq a \leq 1$, $0 < g \leq 1$, $a+g=1$, $0 \leq b \leq 8$, "c" denotes 0 or 1, "d", "e" and "f" each independently denotes a number in the range of 0 to 6 (however, d+e+f does not equal 0), and $R^1$ and $R^2$ each independently represents a halogen or a perfluoroalkyl group or a fluorochloroalkyl group having 1 to 10 carbon atoms.

13. An electrode catalyst layer comprising a composite particle having an electrode catalyst particle supported on an carbon black, activated carbon, graphite, and various metals, a perfluorocarbon sulfonic acid resin (component A) and a polyazole-based compound (component B), wherein polyazole-based compound is selected from the group consisting of compounds represented by chemical formulae (4), (5) and (6) found below;

Formula (4)

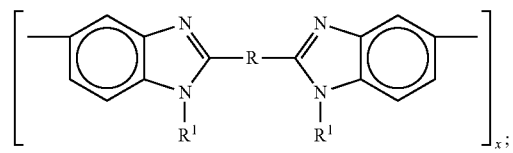

(4)

wherein R represents,

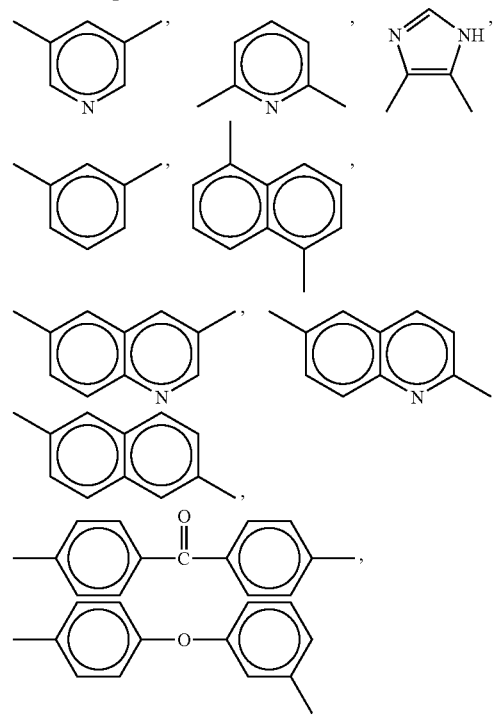

an alkylene chain, a divalent group or a fluoroalkylene chain, each R1 independently represents a hydrogen atom, an alkyl, a phenyl group, or a pyridyl group, and "x" denotes a number from 10 or more to 1.0×107 or less;

Formula (5):

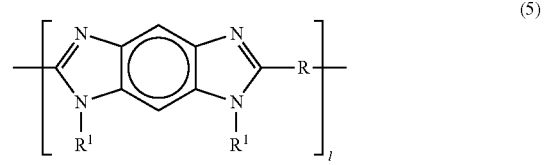

(5)

wherein "1" denotes a number from 10 or more to 1.0×107 or less, and R and R1 are defined in the same manner as in chemical formula (4);

Formula (6):

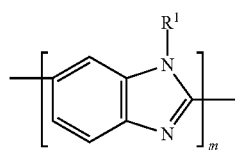

(6)

wherein "m" denotes a number from 10 or more to $1.0 \times 10^7$ or less, and R1 is defined in the same manner as in chemical formula (4);

wherein the content of the composite particle is 20 to 95% by weight, the total weight of component A and component B is 5 to 80% by weight, and the weight ratio (A/B) between component A and component B is 5.6 to 199.

14. The electrode catalyst layer according to claim 13, wherein the weight ratio (NB) between component A and component B is 19 to 199.

* * * * *

UNITED STATES PATENT AND TRADEMARK OFFICE
CERTIFICATE OF CORRECTION

PATENT NO. : 8,795,927 B2  
APPLICATION NO. : 11/793995  
DATED : August 5, 2014  
INVENTOR(S) : Naoto Miyake Page 1 of 1

It is certified that error appears in the above-identified patent and that said Letters Patent is hereby corrected as shown below:

In the Claims

Column 37, Line 27, Claim 4, delete "bibenzoimidazole]" and insert
-- bibenzimidazole] --, therefor.

Column 37, Line 42, Claim 8, delete "bibenzoimidazole]" and insert
-- bibenzimidazole] --, therefor.

Column 37, Line 63, Claim 12, delete ""f"each" and insert -- "f" each --, therefor.

Column 39, Line 19, Claim 14, delete "(NB)" and insert -- (A/B) --, therefor.

Signed and Sealed this
Fourth Day of November, 2014

Michelle K. Lee
*Deputy Director of the United States Patent and Trademark Office*